(12) United States Patent
Hanai

(10) Patent No.: US 12,511,083 B2
(45) Date of Patent: Dec. 30, 2025

(54) SYSTEM, METHOD FOR CONTROLLING SERVER APPARATUS, AND NON-TRANSITORY STORAGE MEDIUM

(71) Applicant: CANON KABUSHIKI KAISHA, Tokyo (JP)

(72) Inventor: Hiroaki Hanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 18/438,935

(22) Filed: Feb. 12, 2024

(65) Prior Publication Data

US 2024/0184490 A1  Jun. 6, 2024

Related U.S. Application Data

(63) Continuation of application No. 18/062,831, filed on Dec. 7, 2022, now Pat. No. 11,928,368.

(30) Foreign Application Priority Data

Dec. 10, 2021 (JP) ................................. 2021-200576
Sep. 20, 2022 (JP) ................................. 2022-148770

(51) Int. Cl.
*G06F 3/12* (2006.01)

(52) U.S. Cl.
CPC .......... *G06F 3/1204* (2013.01); *G06F 3/1231* (2013.01); *G06F 3/1254* (2013.01); *G06F 3/1288* (2013.01)

(58) Field of Classification Search
None
See application file for complete search history.

(56) References Cited

U.S. PATENT DOCUMENTS

2020/0133592 A1* 4/2020 Mitsuhashi ........... G06F 3/1226
2021/0055897 A1* 2/2021 Tomihisa ................ H04L 51/10
2021/0208824 A1* 7/2021 Yamamoto ............ G06F 3/1222

FOREIGN PATENT DOCUMENTS

JP    2021033425 A  *  3/2021  ............. H04L 51/10

* cited by examiner

*Primary Examiner* — Ted W Barnes
(74) *Attorney, Agent, or Firm* — Canon U.S.A., Inc. IP Division

(57) ABSTRACT

A control method for controlling a second server apparatus configured to communicate with a first server apparatus and store a program is provided. The first server apparatus is configured to provide a file sharing service. The program provides a function for printing a file having been uploaded to the first server apparatus. The control method includes: acquiring network information of an information processing apparatus accessing the first server apparatus; selecting, based on the acquired network information, a piece of printer information from among pieces of printer information; and performing control for causing the information processing apparatus to display an object displaying the selected piece of printer information and configured for receiving a selection of printer information from among the pieces of printer information.

13 Claims, 21 Drawing Sheets

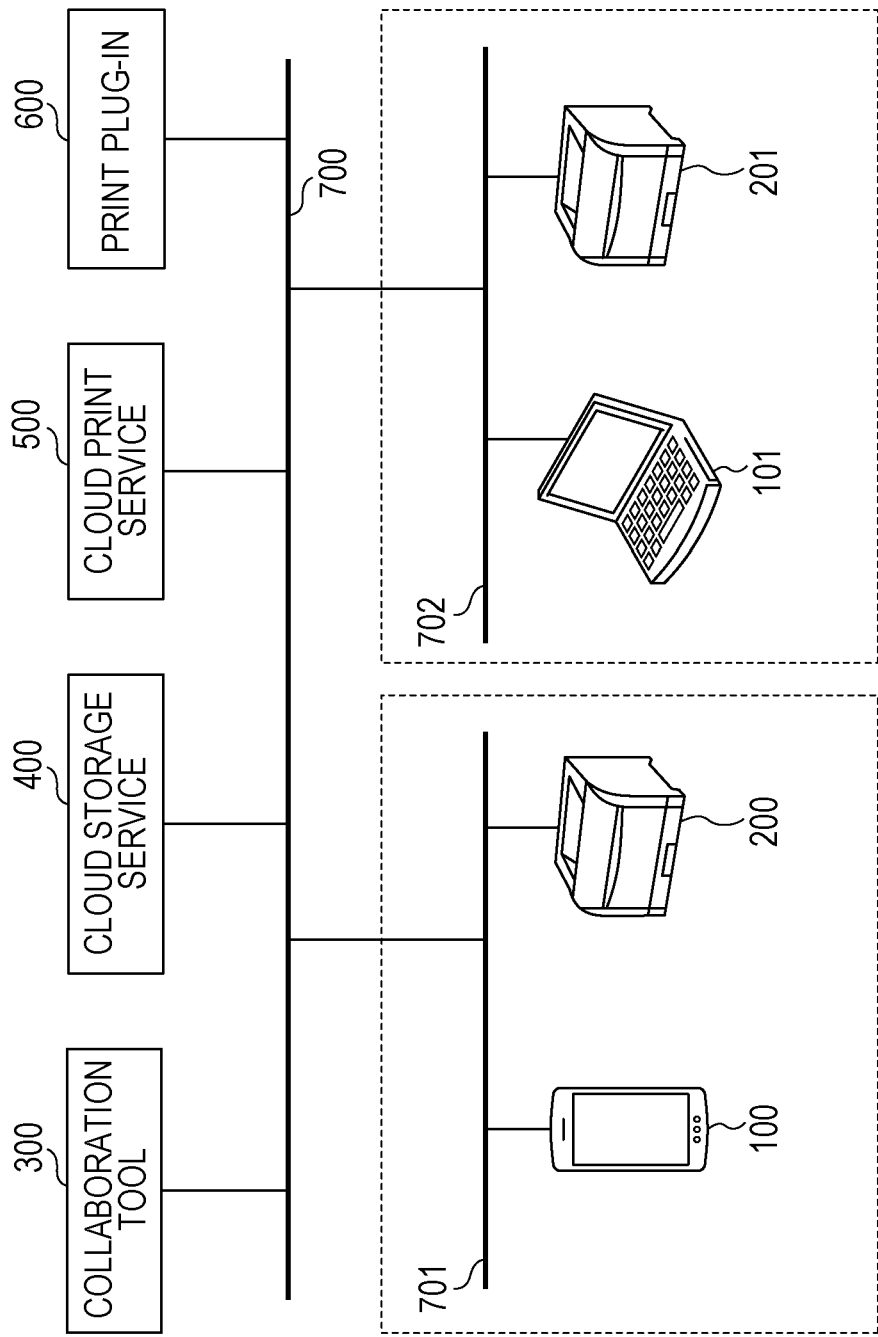

FIG. 6

PRINTER MANAGEMENT TABLE OF USER A

| IP ADDRESS | DEFAULT PRINTER | | PRINTER THAT WAS USED LAST | | |
|---|---|---|---|---|---|
| | PRINTER NAME | PRINTER ID | PRINTER NAME | PRINTER ID | DATE OF LAST USE |
| 172.23.123.11 | Printer A | Id123 | Printer A | Id123 | 2021/11/1 |
| 160.24.987.65 | Printer B | Id128 | Printer B | Id128 | 2021/11/15 |
| 155.10.111.22 | – | – | Printer C | Id124 | 2021/11/28 |
| xxx.yy.~ | Printer X | Id xxx | Printer Y | Id yyy | 2021/9/6 |

FIG. 16

```
{
    "@odata.context" : "https://~",
    "value" : [
        {
            "id" : "xxx-xxx-xxx",
            "createdDateTime" : "20xx-xx-xxTxx:xx:xx ",
            "userId" : "yyyyyy-yyyy-yyyy-",
            "ipAddress" : "zzz.zzz.zzz.zz",          ~1300
            "clientAppUsed" : "Browser",
            "location" : {
                "city" : "",
                "state" : "",
                "geoCoordinates" : {                  ~1301
                    "altitude" : null,
                    "latitude" : aa.aaaaa,
                    "longitude" : bbb.bbbbb
                }
            }
        }
        .
        .
        .
        }
    ]
}
```

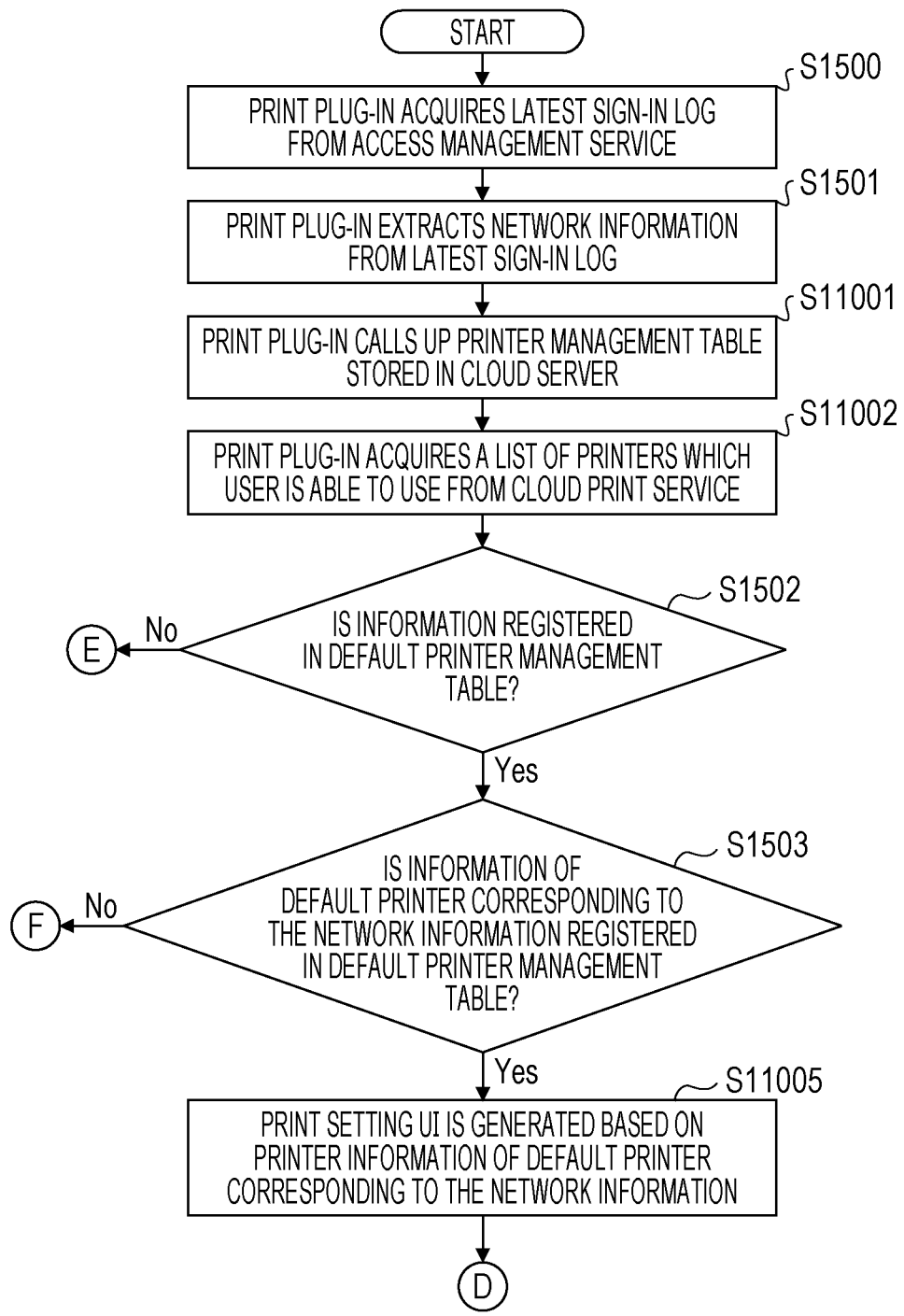

SYSTEM, METHOD FOR CONTROLLING SERVER APPARATUS, AND NON-TRANSITORY STORAGE MEDIUM

CROSS-REFERENCE TO RELATED APPLICATIONS

This application is a Continuation of U.S. patent application Ser. No. 18/062,831, filed Dec. 7, 2022, which claims the benefit of Japanese Patent Application No. 2021-200576, filed Dec. 10, 2021, and Japanese Patent Application No. 2022-148770, filed Sep. 20, 2022, all of which are hereby incorporated by reference herein in their entirety.

BACKGROUND

Field of the Disclosure

The present disclosure relates to a system, a method for controlling a server apparatus, and a non-transitory storage medium.

Description of the Related Art

A cloud print service, which enables a user to give a print instruction from an information communication terminal such as a PC or a smartphone to a printer via a cloud server, has been provided as a means for printing. The cloud print service has a function of pre-registering and managing printers that support the cloud print service. After logging in to the cloud print service from the information communication terminal, the user is able to confirm a list of already-registered printers on a UI, make a selection from the list, and give an instruction for printing. However, it is burdensome to select the printer which the user wants to use from among the already-registered printers in the list every time, and this burden on the user becomes heavier as the number of the registered printers increases. For a solution, in Japanese Patent Laid-Open No. 2021-121076, the printer that is in regular use (hereinafter referred to as "default printer") is managed individually on a user-by-user basis on the cloud server. Japanese Patent Laid-Open No. 2021-121076 discloses a method of setting the default printer by transmitting a default printer setting request together with the physical ID of the printer that is in front of the user from the information communication terminal to the cloud print service.

However, in Japanese Patent Laid-Open No. 2021-121076, the number of default printers that can be registered into the cloud server from the default printer setting application installed in the information communication terminal is just one for each user. Printers having been registered in the cloud print service are located at various places. Accordingly, the user has to perform default printer setting again using the default printer setting application each time the user moves from one location to another. Additionally, it could happen that a print output is made from a wrong printer when the user moves from one location to another; this is because the default printer is not updated unless the user performs the default printer setting.

SUMMARY

Embodiments of the present disclosure provide a control method for controlling a second server apparatus configured to communicate with a first server apparatus and store a program. The first server apparatus is configured to provide a file sharing service. The program provides a function for printing a file having been uploaded to the first server apparatus. The control method includes: acquiring network information of an information processing apparatus accessing the first server apparatus; selecting, based on the acquired network information, a piece of printer information from among pieces of printer information; and performing control for causing the information processing apparatus to display an object displaying the selected piece of printer information and configured for receiving a selection of printer information from among the pieces of printer information.

Further features of the present disclosure will become apparent from the following description of exemplary embodiments with reference to the attached drawings.

BRIEF DESCRIPTION OF THE DRAWINGS

FIG. 1 is a diagram illustrating an example of a network configuration according to an exemplary embodiment.

FIG. 6 is a diagram illustrating an example of a default printer management table according to an exemplary embodiment.

FIG. 16 is a diagram illustrating an example of a response obtained from an account management service according to the third embodiment.

FIGS. 17A and 17B are a flowchart illustrating processing till displaying a print setting UI by the print plug-in according to the third embodiment.

DESCRIPTION OF THE EMBODIMENTS

First Embodiment

Figure 2A:
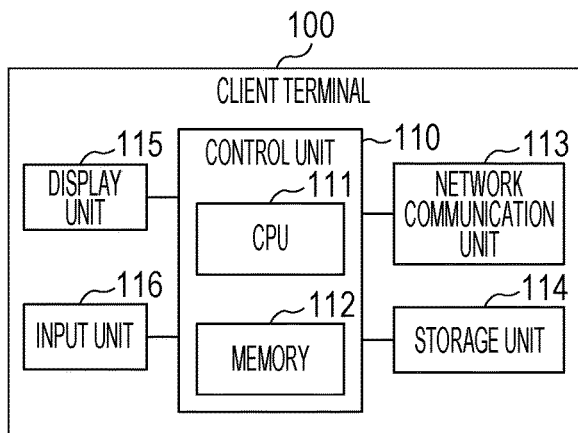
FIG. 2A is a diagram illustrating an example of a hardware configuration of a client terminal according to an exemplary embodiment.

With reference to the accompanying drawings, some exemplary embodiments of the present disclosure will now be explained.

FIG. 1 is a simplified network configuration diagram schematically illustrating an environment of a network 700 according to an exemplary embodiment of the present disclosure. The network 700 is a network for connection of client terminals 100 and 101, printers 200 and 201, and various servers.

The client terminal 100 and the printer 200 are connected to an identical intra network 701, and to the network 700 via the intra network 701. The client terminal 101 and the printer 201 are connected to another intra network 702, and to the network 700 via the intra network 702. A collaboration tool 300, a cloud storage service 400, a cloud print service 500, and a print plug-in 600 are connected to the network 700.

The collaboration tool 300 is a server system configured to provide services which applications running on the client terminal 100, 101 execute and/or an online meeting service programmed to operate on a Web browser of the client terminal 100, 101. The collaboration tool 300 performs user-ID-and-password-based account management. The collaboration tool 300 causes the client terminal 100, 101 to display a login screen when accessed therefrom, and waits for an input of a user ID and password. Based on the inputted user ID and password, the collaboration tool 300 performs user authentication. A login to the service enables the authenticated user to use it. The collaboration tool 300 provides a video-call or chat-based meeting function online to the client terminal used by the login user. In addition, a user who does not have the user's own registered account is also able to use the collaboration tool 300 on a temporary basis when invited as a guest by the login user.

The cloud storage service 400 is a server system comprised of one or more server apparatuses. The cloud storage service 400 is a cloud-constructed (i.e., server-system-based) Internet storage service. The cloud storage service 400 is accessible from the client terminal 100, 101 using a cloud-storage ID and password. The user is able to upload file data to the cloud storage service 400 and download file data from the cloud storage service 400. The uploaded file data can be shared with other users. Depending on settings, restrictions on browsing, editing, and downloading can be imposed on a user-by-user or group-by-group basis.

The cloud print service 500 is a cloud-based (i.e., server-system-based) print service available via an Internet network constructed on a cloud system that is a server system comprised of one or more server apparatuses. The cloud print service 500 is connectable to the client terminal 100 and the printer 200, and to the client terminal 101 and the printer 201, via the Internet. The cloud print service 500 performs account management using a cloud-printing ID and password. The user is able to access the cloud print service 500 by using this account. The cloud print service 500 receives print data from the client terminal 100, 101, and performs management for each individual user. In addition, the cloud print service 500 transmits the print data received from the client terminal 100, 101 to the printer 200, 201.

The print plug-in 600 is capable of working together with the cloud storage service 400 and the cloud print service 500 online and furnishes the collaboration tool 300 with a print function. The print plug-in 600 is a server system comprised of one or more server apparatuses. A vendor who provides the print plug-in 600 creates a print plug-in that can be used as an add-on function of the collaboration tool 300 and registers the print plug-in into the collaboration tool 300. A user installs the print plug-in on the collaboration tool 300, and this enables the user to instruct for print execution using the print plug-in 600. After the user adds the print plug-in onto the collaboration tool 300, the collaboration tool 300 displays an icon of the print plug-in. When the user selects the print icon, the print plug-in is activated, and a print UI is displayed. A result of operation of the print UI is transmitted to the print plug-in 600. Based on the received information, the print plug-in 600 performs processing. Then, upon receiving a print command from the print UI, based on information acquired from the collaboration tool 300 such as message information and file information, the print plug-in 600 performs print processing via the cloud print service 500. Using the print plug-in 600 enables print execution without any need for downloading a file shared on the collaboration tool 300 to a local storage of the client terminal 100. Moreover, using the print plug-in 600 enables print execution even when a printer driver is not installed in the client terminal 100, 101.

Accesses to the collaboration tool 300, the cloud storage service 400, and the cloud print service 500 can be made by using a collaboration tool account, thanks to single sign-on technology.

Next, with reference to FIGS. 2A to 2F, a hardware configuration of a system according to the present embodiment will now be explained.

FIG. 2A is a block diagram illustrating an example of a hardware configuration of the client terminal 100. The client terminal 100 includes a control unit 110, a network communication unit 113, a storage unit 114, a display unit 115, and an input unit 116. The control unit 110 includes a CPU 111 and a memory 112 and controls the overall operation of the client terminal 100. The CPU 111 loads a program stored in the storage unit 114 into the memory 112 and runs the loaded program. The memory 112 is a main memory of the CPU 111 and is used as a work area and a temporary storage area for the loading of various kinds of program. The network communication unit 113 is a device configured to communicate with an external server or an external information processing terminal via the external network 700 for inputting and outputting digital data. The storage unit 114 is a nonvolatile storage device such as a hard disk drive or an SSD. Digital data can be stored and overwritten into the storage unit 114. The display unit 115 is a device configured to display visual information for real-time presentation to the user, for example, a liquid crystal display. The input unit 116 is a device configured to receive an input from the user, for example, a keyboard, a mouse, a camera, or a microphone. A device that has both an input function and a display function, for example, a touch panel, may be adopted. In the present embodiment, it is assumed that an application for using the collaboration tool 300 is installed in the client terminal 100 and that the user uses the functions of the collaboration tool 300 through the intermediary of the application.

Figure 2B:
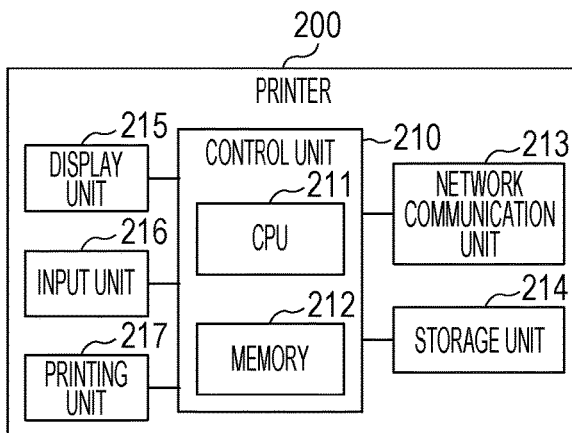
FIG. 2B is a diagram illustrating an example of a hardware configuration of a printer according to an exemplary embodiment.

FIG. 2B is a block diagram illustrating an example of a hardware configuration of the printer 200. The printer 200 includes a control unit 210, a network communication unit 213, a storage unit 214, a display unit 215, an input unit 216, and a printing unit 217. An explanation of the control unit 210 and the storage unit 214 is omitted because they are similar to the counterparts illustrated in FIG. 2A. The network communication unit 213 is a device for communication via the external network 700. The network communication unit 213 mainly plays a role of receiving print data and transmitting information on the status of the printer 200 such as an error to an external server or the like. If the printer 200 supports cloud printing, the network communication unit 213 communicates with the cloud print service 500 to transmit registration information and receive a job. The display unit 215 is a device configured to display and present information on a real-time basis to the user, for example, a touch panel or an LED which the printer 200 is equipped with. The input unit 216 is a device configured to receive an input from the user. One example of the input unit 216 is a touch panel. The input unit 216 may have a hardware key configuration such as a numeric keypad. The printing unit 217 is device configured to form an image on a sheet fed from a cassette or a tray by performing a series of operations including sheet feeding, printing, and sheet ejection. The method of printing is not specifically limited. For example, the printing unit 217 may perform electrophotographic printing and ink-jet printing. A duplex unit and a finisher, which are used in the process of sheet ejection, are also encompassed within the concept of the printing unit 217. The printer 200 may be a multifunction printer (multifunction peripheral) that includes a scanner and has, in addition to a print function, a scan function of scanning a document and a FAX function.

Figure 2C:
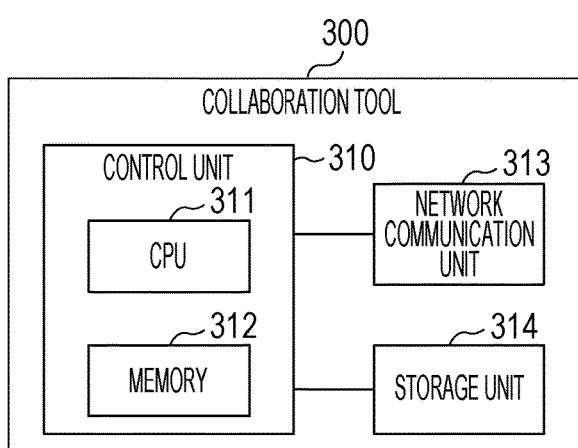
FIG. 2C is a diagram illustrating an example of a hardware configuration of a collaboration tool according to an exemplary embodiment.

FIG. 2C is a block diagram illustrating an example of a hardware configuration of a server apparatus configured as the collaboration tool 300. The collaboration tool 300 includes a control unit 310, a network communication unit 313, and a storage unit 314. A detailed explanation of them is omitted because they are similar to the counterparts illustrated in FIG. 2A. The network communication unit 313 is used for communicating with the client terminal 100 so as to receive various kinds of operation from the user and for communicating with the print plug-in 600 and the cloud storage service 400.

Figure 2D:
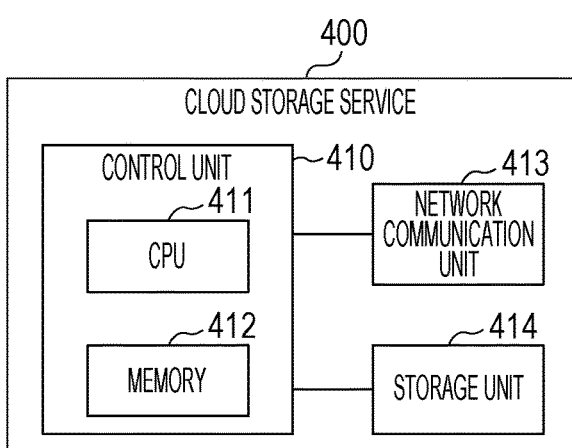
FIG. 2D is a diagram illustrating an example of a hardware configuration of a cloud storage service according to an exemplary embodiment.

FIG. 2D is a block diagram illustrating an example of a hardware configuration of the cloud storage service 400. The cloud storage service 400 includes a control unit 410, a network communication unit 413, and a storage unit 414. A detailed explanation of them is omitted because they are similar to the counterparts illustrated in FIG. 2A. Files uploaded from the client terminal 100 are stored in the storage unit 414. The control unit 410 performs processing for file display, file transmission, and file uploading in response to accesses made from the client terminal 100 and from the collaboration tool 300.

Figure 2E:
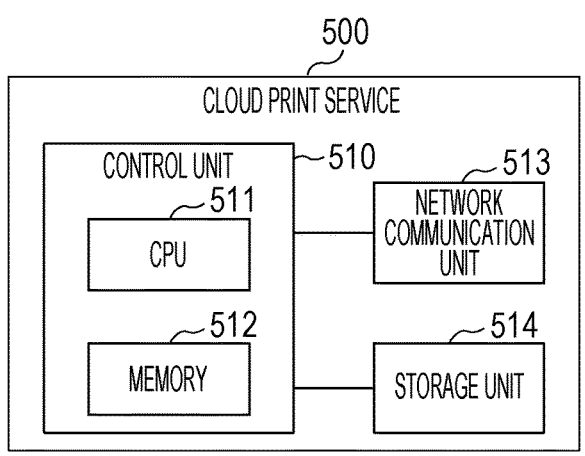
FIG. 2E is a diagram illustrating an example of a hardware configuration of a cloud print service according to an exemplary embodiment.

FIG. 2E is a block diagram illustrating an example of a hardware configuration of the cloud print service 500. The cloud print service 500 includes a control unit 510, a network communication unit 513, and a storage unit 514. A detailed explanation of them is omitted because they are similar to the counterparts illustrated in FIG. 2A. Print data received from the client terminal 100 and from the print plug-in 600, and information on the printer 200 used for printing, are stored in the storage unit 514. The network communication unit 513 is used for communicating with the client terminal 100, the print plug-in 600, and the printer 200.

Figure 2F:
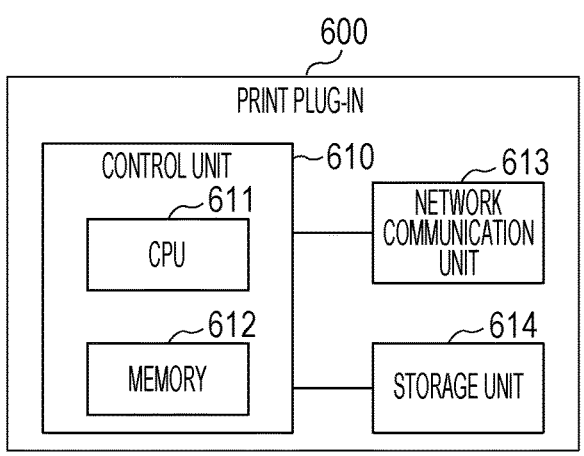
FIG. 2F is a diagram illustrating an example of a hardware configuration of a print plug-in according to an exemplary embodiment.

FIG. 2F is a block diagram illustrating an example of a hardware configuration of the print plug-in 600. The print plug-in 600 includes a control unit 610, a network communication unit 613, and a storage unit 614. A detailed explanation of them is omitted because they are similar to the counterparts illustrated in FIG. 2A. The network communication unit 613 is used for communicating with the collaboration tool 300 and the cloud print service 500.

The collaboration tool 300, the cloud storage service 400, the cloud print service 500, the print plug-in 600 may be configured in the form of a single information processing apparatus described above. Alternatively, plural information processing apparatuses described above may cooperate with one another to fulfill the functions thereof.

Next, each processing according to the present embodiment will now be explained in detail.

Figure 3:
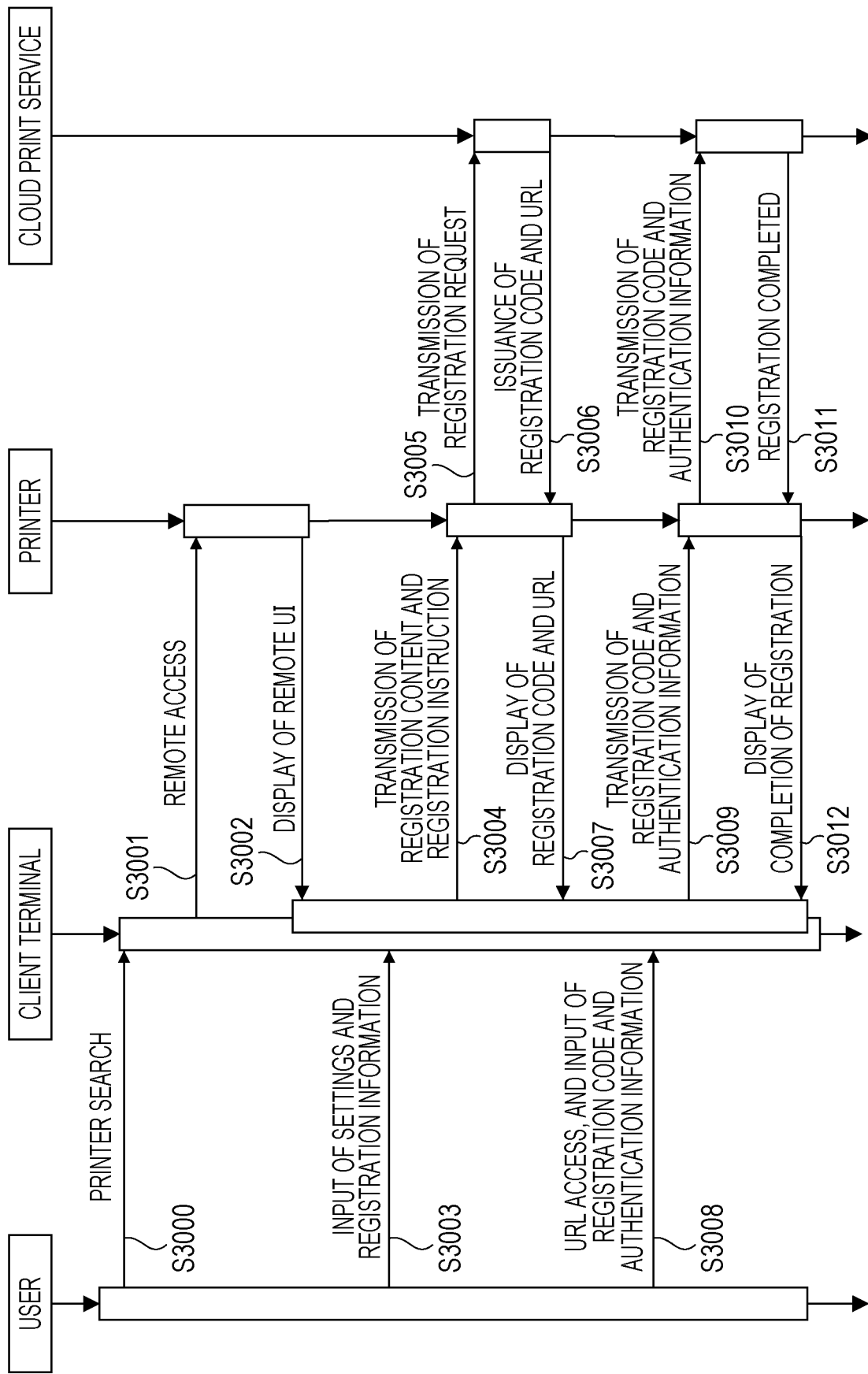
FIG. 3 is a diagram illustrating an example of a sequence of registering a printer into the cloud print service according to an exemplary embodiment.

First, with reference to a sequence chart of FIG. 3, processing for registering information on the printer 200 into the cloud print service 500 will now be explained. In order to use the cloud print service 500, it is necessary to register, into the cloud print service 500, information on a printer which the user wants to use for printing. A series of steps for this registration is illustrated in FIG. 3.

In the present embodiment, it is assumed that an access is made from the client terminal 100 to the printer 200 and that the printer 200 is registered into the cloud print service 500 via a setting screen provided by a web server function of the printer 200.

The user inputs an IP address of the printer 200 on a browser of the client terminal 100 and instructs the client terminal 100 to execute a search (S3000). Though a method of accessing the printer 200 by using its IP address is described here, any other method may be used for accessing the printer 200.

The client terminal 100 accesses the inputted IP address (S3001). The client terminal 100 transmits a request for acquiring a remote UI screen to the inputted IP address.

In response to the request made from the client terminal 100, the printer 200 transmits a remote UI screen and causes the browser of the client terminal 100 to display the remote UI screen (S3002). The remote UI screen displayed on the client terminal 100 is a screen for inputting a user ID and password.

The user inputs the user ID and password on the screen displayed on the client terminal 100 and gives a login instruction. The client terminal 100 notifies the printer 200 of the inputted user ID and password. The printer 200 performs user authentication. If the user authentication is successful, the printer 200 transmits the next screen to the client terminal 100.

After the login, the user operates the remote UI screen to instruct that a network setting form be displayed, and then inputs basic settings and registration information of the cloud print service 500 (S3003). The basic settings of the cloud print service 500 include a setting regarding a printer name of the printer 200. When registering the printer 200 into the cloud print service 500, the user sets the name of the printer to be used, and then presses a "Register" button. When this button is pressed, the client terminal 100 transmits registration content and registration instruction to the printer 200 (S3004).

Upon receiving the registration content and registration instruction, the printer 200 transmits a registration request for registering the printer 200 to the cloud print service 500 (S3005).

Upon receiving the registration request from the printer 200, the cloud print service 500 issues a registration code and URL, and returns the registration code and URL to the printer 200 (S3006).

Upon receiving the registration code and URL, the printer 200 causes the client terminal 100 to display the received registration code and URL (S3007). When the user accesses the URL displayed on the browser, a registration form and an authentication form are displayed sequentially. The registration form is a screen for inputting the registration code displayed on the client terminal 100. The authentication form is a screen for user authentication. The user inputs the user ID and password (S3008).

The client terminal 100 transmits the content of the input made by the user to the printer 200 (S3009). The printer 200 transmits the content of the input to the cloud print service 500 (S3010). Based on the content of the input received from the printer 200, the cloud print service 500 executes a printer registration job, and, upon completion of registration, notifies the printer 200 to the effect that the registration has completed (S3011). In addition, upon completion of registration of the printer 200 into the cloud print service 500, the printer 200 causes the browser of the client terminal 100 to perform display to the effect that the registration has completed (S3012). Registering printer information into the cloud print service in this way enables the user to command print execution using the printer 200 via the cloud print service.

Figure 4:
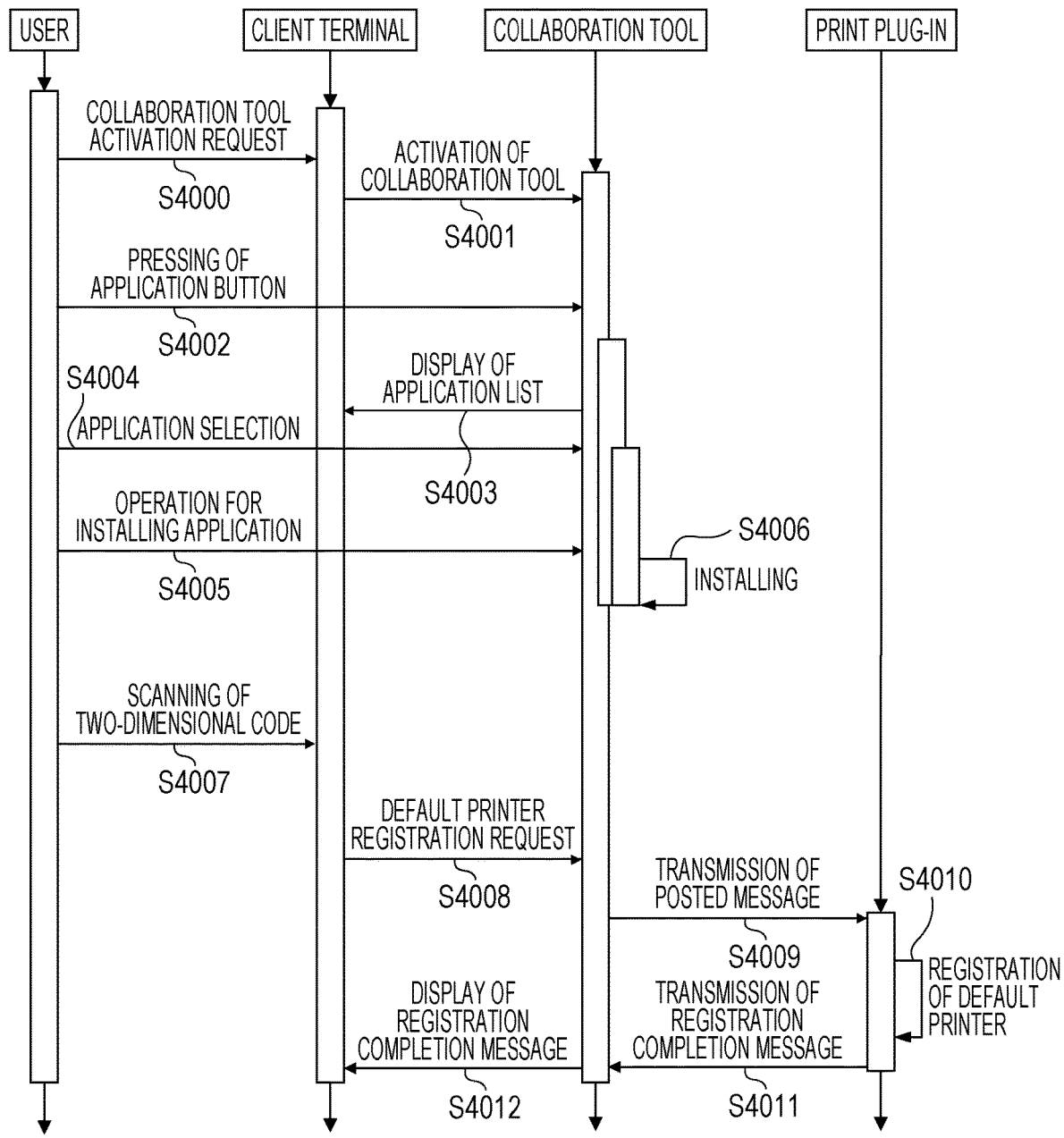
FIG. 4 is a diagram illustrating an example of a sequence of installing of the printer plug-in and setting of a default printer according to a first embodiment.

Next, with reference to a sequence chart of FIG. 4, and UI examples of the collaboration tool 300 in FIGS. 5A, 5B, 5C, and 5D, a method of installing an application for the collaboration tool 300 and setting a default printer will now be explained. FIG. 4 is a sequence chart illustrating the installing of the print plug-in into the collaboration tool and processing for registration of a default printer. FIGS. 5A, 5B, 5C, and 5D are diagrams illustrating an example of screen transition occurring when the print plug-in is installed into the collaboration tool.

Installing of Application and Setting of Default Printer

The user selects a collaboration tool application that has already been installed in the client terminal 100, and inputs a collaboration tool activation request (S4000). It is assumed here that an access to the collaboration tool 300 is made using the collaboration tool application installed in the client terminal 100 operated by the user. Alternatively, an access to the collaboration tool 300 may be made via a web browser installed in the client terminal 100, and a screen provided by the collaboration tool may be displayed.

Figure 5A:
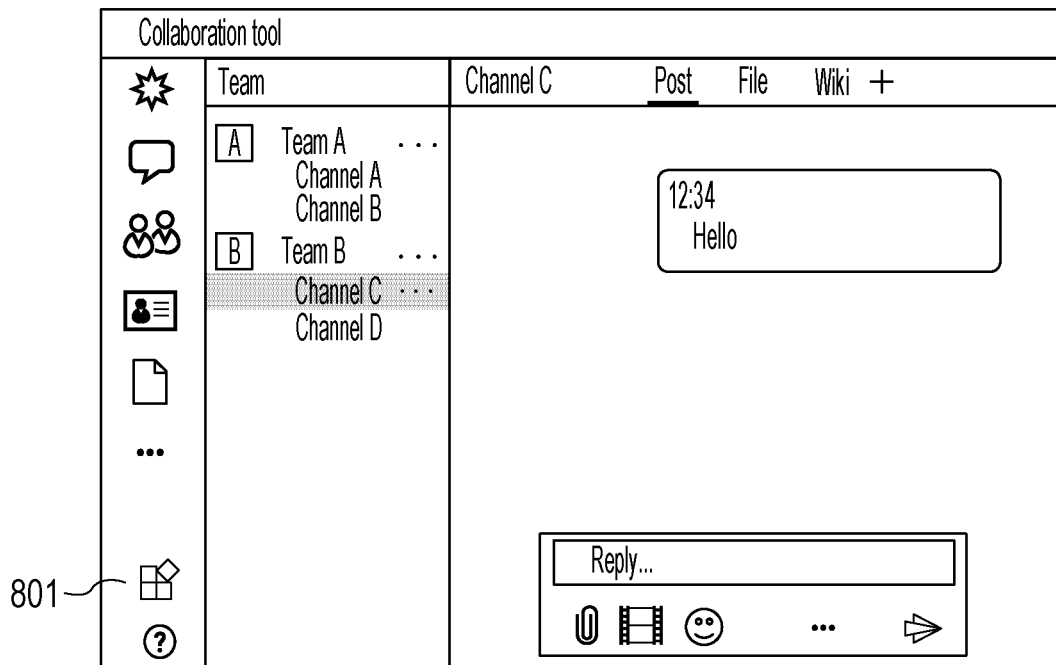
FIG. 5A is a diagram illustrating an example of an application installing screen of the collaboration tool according to an exemplary embodiment.

Upon receiving the activation request made by the user, the client terminal 100 activates the collaboration tool 300 (S4001). After the collaboration tool activation, the user selects an application button 801 displayed on the collaboration tool 300 as illustrated in FIG. 5A (S4002). In S4002, the user operates the client terminal 100 to select the application button 801, and the client terminal 100 notifies the collaboration tool of the selection of this button.

Figure 5B:
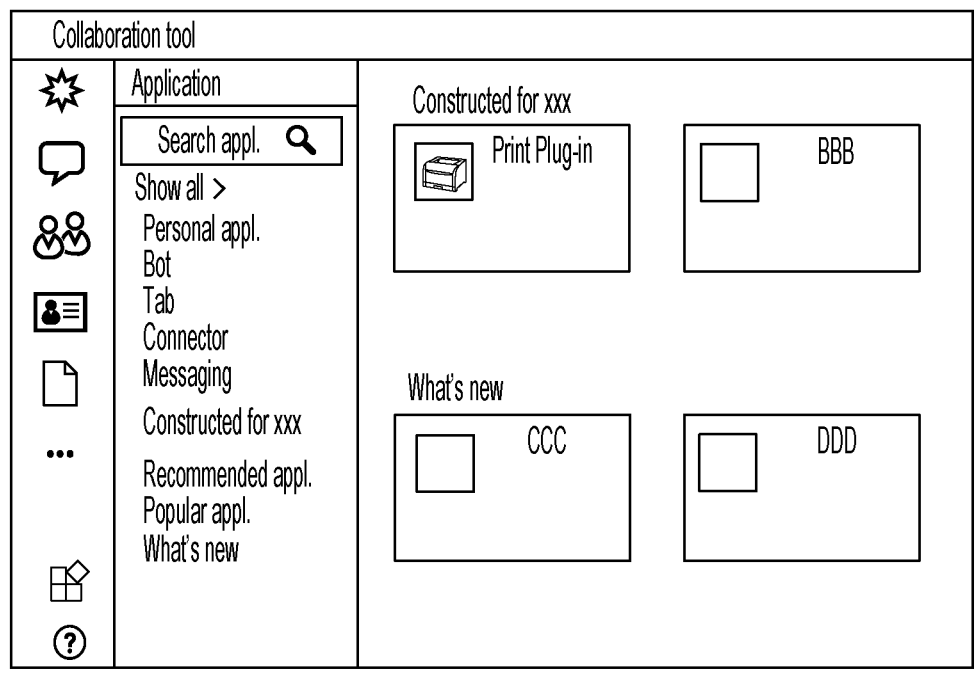
FIG. 5B is a diagram illustrating an example of another screen of the collaboration tool according to an exemplary embodiment.

The collaboration tool 300 acquires a list of applications that can be installed from the server and causes the client terminal to display an application list screen illustrated in FIG. 5B (S4003).

On the application list screen illustrated in FIG. 5B, applications are grouped. The user operates the client terminal 100 to select an application which the user demands, from among those in the list (S4004). Information on the application selected by the user is notified to the collaboration tool.

Figure 5C:
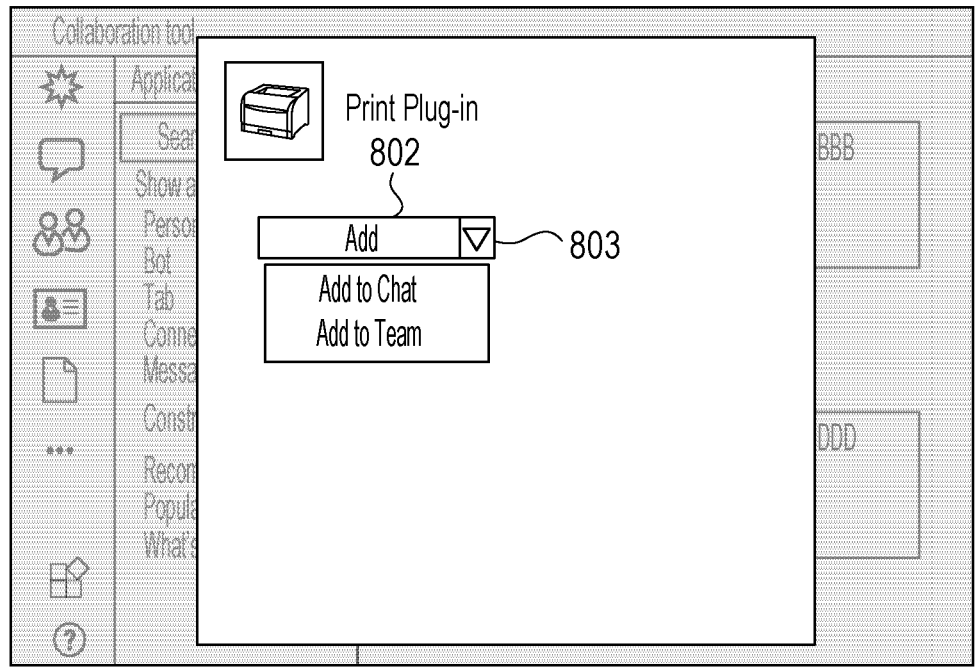
FIG. 5C is a diagram illustrating an example of another screen of the collaboration tool according to an exemplary embodiment.

In response to the selection of the application by the user, pop-up display of a UI illustrated in FIG. 5C appears. The UI illustrated in FIG. 5C includes, in addition to an "Add" button 802, a drop-down button 803 to open an expansion box including an "Add to Chat" button and an "Add to Team" button. The user is able to install an application individually by pressing the "Add" button 802 (S4005). In this process, the user is able to designate an installing destination by selecting the "Add to Chat" button or the "Add to Team" button in the expansion box of the drop-down button 803 and then by inputting a team name or a channel name for designation of the installing destination on a UI that will appear next. Upon receiving the installing instruction from the user, the collaboration tool 300 executes the installing of the application (S4006).

In the present embodiment, a collaboration tool user ID and an application identifier of an application that the user is able to use are stored in association with each other into the storage unit of the collaboration tool 300. If the user selects "Add to Chat" or "Add to Team" in FIG. 5C, the collaboration tool 300 performs the following processing. If "Add to Chat" is selected, the identifier of the chat designated by the user and the identifier of the application are stored in association with each other into the storage unit of the collaboration tool 300. If "Add to Team" is selected, the identifier of the team designated by the user and the identifier of the application are registered in association with each other into the storage unit of the collaboration tool 300.

Next, setting a default printer by the print plug-in 600 will now be explained. In the present embodiment, processing for registering a default printer by using a QR code (registered trademark) (two-dimensional code) containing written information about the printer 200 will be described.

For example, a QR code is printed as follows. The user activates the collaboration tool application installed in the client terminal 100 to display a chat room for users and the print plug-in. The user inputs, into a chat box, a predetermined message to the effect that the QR code will be printed, and then posts the message. The collaboration tool 300 receives the message from the client terminal 100, and performs message notification to the print plug-in 600. The print plug-in 600 analyzes the received message and determines whether a predetermined message to the effect that the QR code will be printed is contained therein or not. If the predetermined message is contained therein, the print plug-in 600 accesses the cloud print service 500 and acquires a list of printers which the user who is logged in to the collaboration tool 300 is able to use. The print plug-in 600 notifies the collaboration tool 300 of the printer list acquired from the cloud print service 500, and causes the client terminal 100 to display the printer list. From among those in the printer list displayed on the client terminal 100, the user selects the printer name of the printer 200 which the user wants to use for printing the QR code. The selected printer name is notified to the collaboration tool 300. The collaboration tool 300 notifies the print plug-in 600 of the printer name notified from the client terminal 100. The print plug-in 600 generates a QR code that contains information including the printer name of the notified printer, the printer ID thereof, and the application identifier of the print plug-in. In addition to these kinds of information, the QR code generated by the print plug-in contains information for causing the collaboration tool 300 to display a message to be used at the time of registration of the default printer. The print plug-in 600 transmits the generated QR code to the printer 200 via the cloud print service 500. The printer 200 prints the QR code received from the cloud print service 500. The user affixes the printed QR code to the printer.

In the above embodiment, it has been described that the user gives a print instruction for printing the QR code via a chat screen displayed by the collaboration tool application. An application for the print plug-in may be installed into the printer 200, and the QR code may be printed using the installed application. In this case, the user operates the display unit 215 of the printer 200 to activate the application corresponding to the print plug-in and give a print instruction. The application generates a QR code that contains the information described above and, the generated QR code is printed. Instead of using the display unit 215 of the printer 200, the print instruction for printing the QR code may be given by using a remote UI function that is available by accessing the printer 200 from the client terminal 100. In the example described above, the printing of a QR code is started by posting a predetermined message by the user. The print plug-in may command that a QR code print button be displayed on a screen of the collaboration tool, and the user may select the QR code print button so as to start processing necessary for printing the QR code.

In the description below, it is assumed that the printing of a QR code for default printer registration has been completed and that the QR code has been affixed to the printer 200.

The user scans the QR code affixed to the body of the printer 200 by means of a camera function of the client terminal 100 (S4007). In the QR code, the printer name of the printer 200, the printer ID thereof, the application identifier of the print plug-in, a character string for activating a QR collaboration tool, and a character string which the user wants to be displayed as a message on a chat screen after the activation of the collaboration tool are stored in the form of a URL.

Figure 5D:
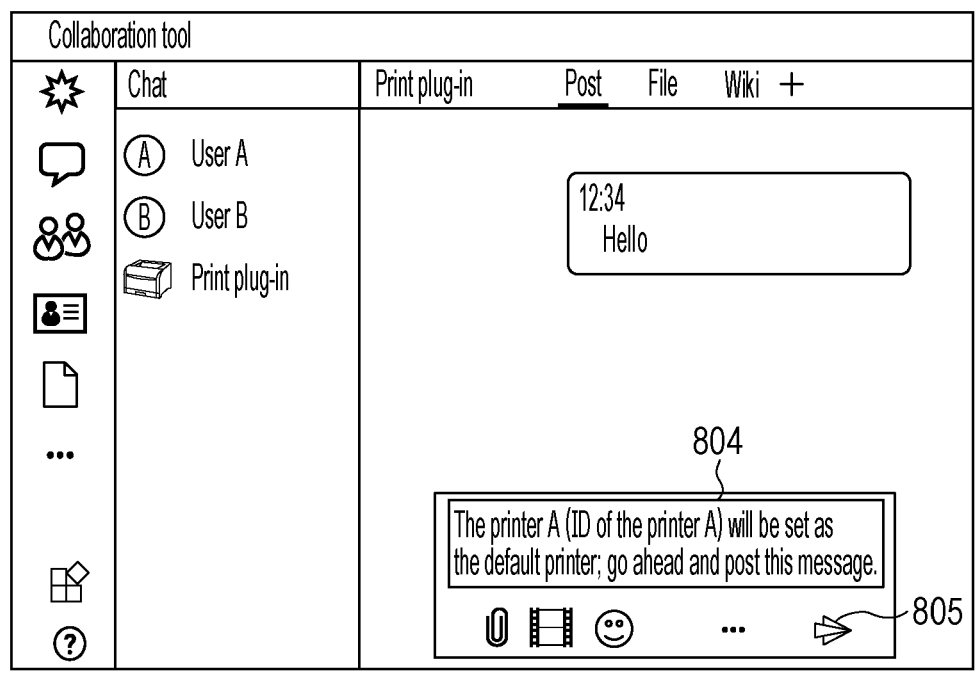
FIG. 5D is a diagram illustrating an example of another screen of the collaboration tool according to an exemplary embodiment.

In accordance with a command contained in the QR code, the client terminal 100 activates the collaboration tool application. The collaboration tool application identifies the print plug-in 600 by the application identifier contained in the QR code, and displays a screen of a chat room for users and the print plug-in 600. In addition, based on the information contained in the QR code, the collaboration tool application displays a screen illustrated in FIG. 5D on the client terminal 100. FIG. 5D illustrates a chat room for users and the print plug-in 600. In an area 804, a message saying "The printer A (ID of the printer A) will be set as the default printer; go ahead and post this message" is inputted automatically. In the message, the portion "printer A" represents the printer name contained in the QR code; a character string that differs from printer to printer is displayed here. In the message, the portion "ID of the printer A" represents the printer ID contained in the QR code; a character string that differs from printer to printer is displayed here. When the user presses a "Post" button 805, the message inputted in the area 804 is transmitted to the collaboration tool 300 (S4008). In S4008, based on the user instruction, the client terminal 100 transmits the posted message to the collaboration tool 300.

Upon receiving the registration request, the collaboration tool 300 transmits the posted message to the print plug-in 600 (S4009). The transmitted message contains the printer name of the printer 200 which the user wants to be registered as the default printer, and the printer ID thereof.

Upon receiving the information, based on the printer name and the printer ID contained in the received message, the print plug-in 600 registers the printer 200 as the default printer into the storage unit of the print plug-in 600 (S4010). In the processing in S4010, the print plug-in 600 transmits, to the collaboration tool 300, a request for acquiring an IP address that is network information of the client terminal 100 operated by the user. The print plug-in 600 acquires the IP address of the client terminal 100 from the collaboration tool 300 and generates a table illustrated in FIG. 6. Each IP address illustrated in FIG. 6 is a global IP address, which is information for roughly indicating a location by the client terminal 100.

A detailed explanation of default printer registration processing will be given later with reference to FIG. 10. FIG. 6 is a diagram illustrating an example of a default printer management table managed by the print plug-in 600. The default printer management table is a table for managing the default printer for a case where printing is performed using the print plug-in 600. In the default printer management table, the IP address used when the client terminal 100 accesses the collaboration tool 300, the printer name of the printer registered as the default printer, and the printer ID thereof, are managed in association with one another. In addition, in this table, the IP address of the client terminal 100, the printer name of the printer which the user used last, and the printer ID thereof, are also managed in association with one another. The IP address registered in this table is an IP address which the print plug-in 600 is capable of acquiring by accessing the collaboration tool 300, and is information indicating from which network the user is accessing the collaboration tool 300. This IP address does not necessarily have to be real-time one; an IP address at the timing of the user having logged in to the collaboration tool 300 may be used. Though FIG. 6 provides an illustrative example in which the IP address is used as information about the location at the time of the user using the printer, location information such as GPS information may be registered in association with the printer name and the printer ID.

After registering the IP address of the client terminal 100 and the printer name in association with each other, the print plug-in 600 sends a message to the effect that registration has completed to the collaboration tool 300 (S4011). The collaboration tool 300 causes this registration completion message received from the print plug-in 600 to be displayed on a chat room of the collaboration tool application of the client terminal 100 (S4012).

In the above embodiment, it has been described that the user prints a QR code for default printer registration and affixes the printed code to the printer 200. However, an application for the print plug-in 600 may be installed in the printer 200, and the user may activate the application by operating the display unit 215 of the printer 200 and cause the display unit 215 to display the QR code.

In the above embodiment, it has been described that the IP address of the client terminal 100 performing the transmission in S4008 is registered in association with the printer name and the printer ID into the default printer table. However, the QR code may contain the IP address of the printer, and this IP address may be registered in association with the printer name and the printer ID into the default printer management table.

Display and Transition of Print UI

Figure 7A:
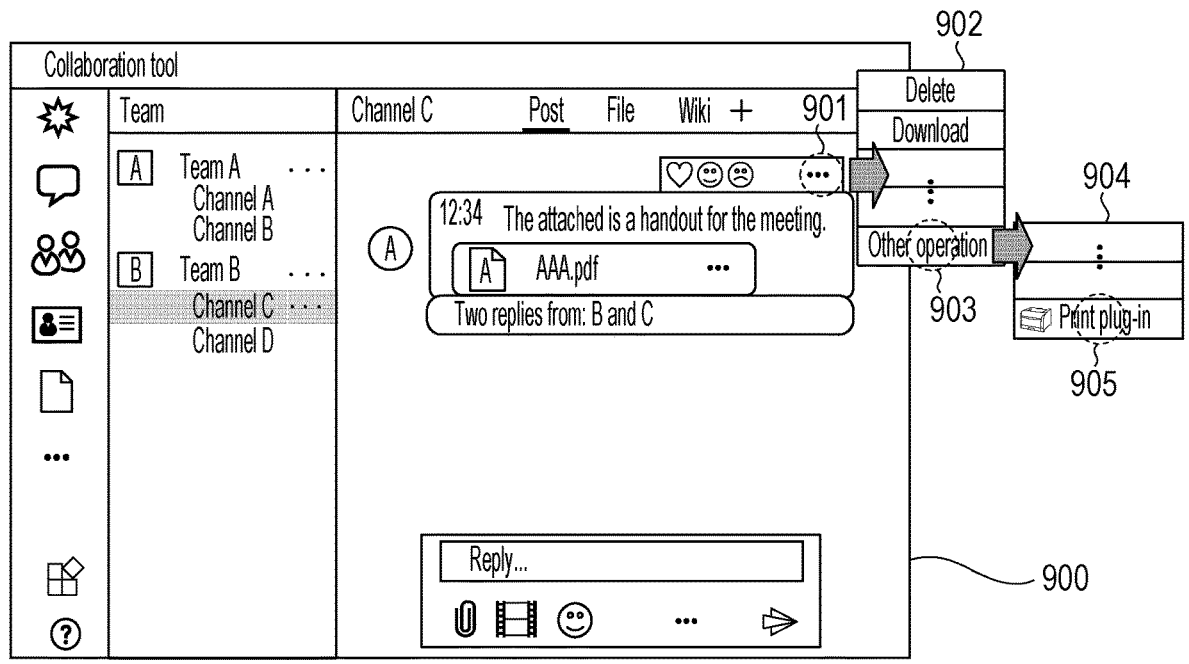
FIG. 7A is a diagram illustrating an example of UI transition for printing using the print plug-in according to an exemplary embodiment.
Figure 7B:
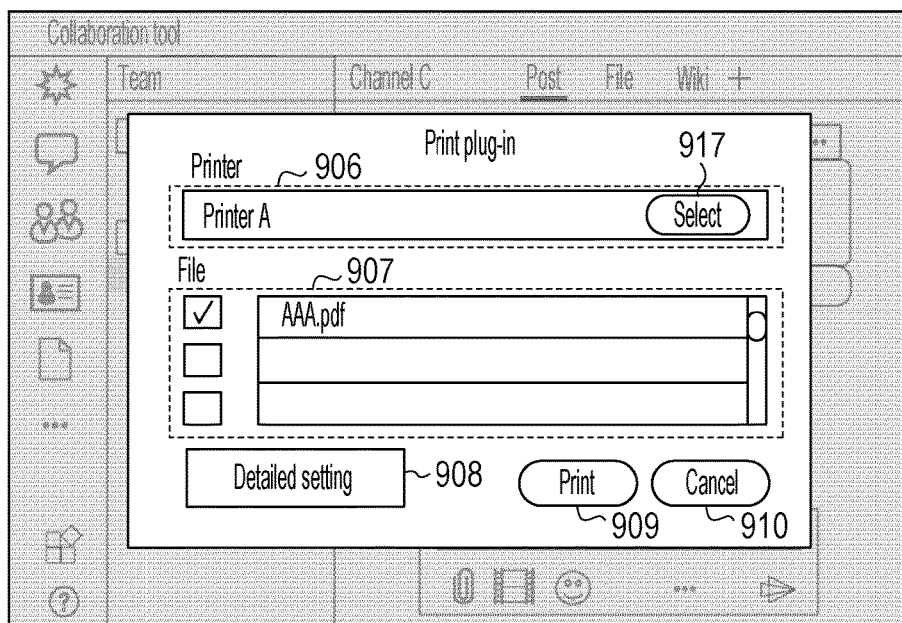
FIG. 7B is a diagram illustrating an example of UI transition for printing using the print plug-in according to an exemplary embodiment.
Figure 8A:
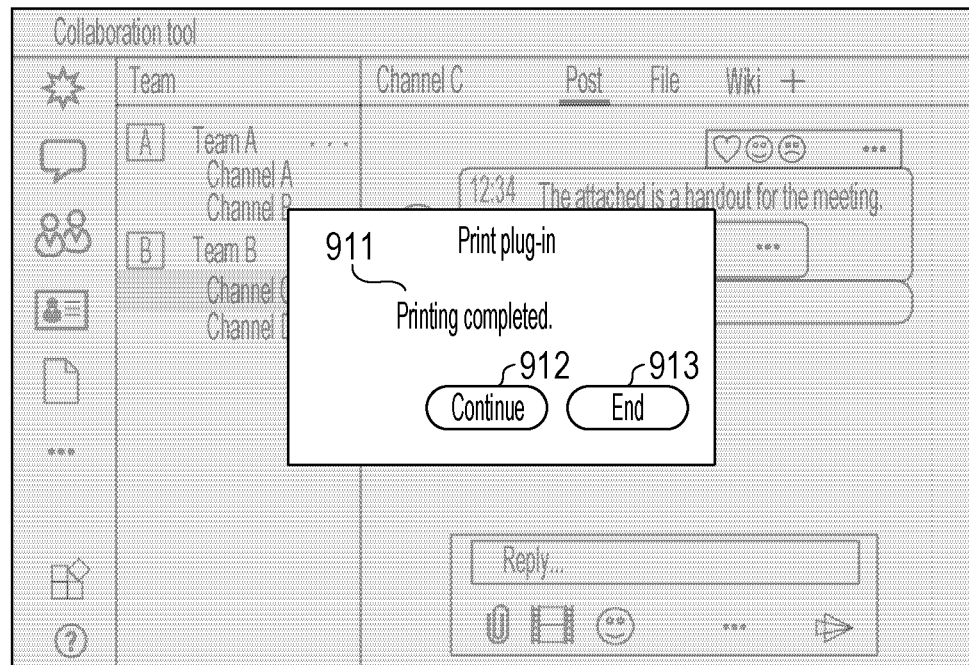
FIG. 8A is a diagram illustrating an example of a screen which the print plug-in causes the client terminal to display.
Figure 8B:
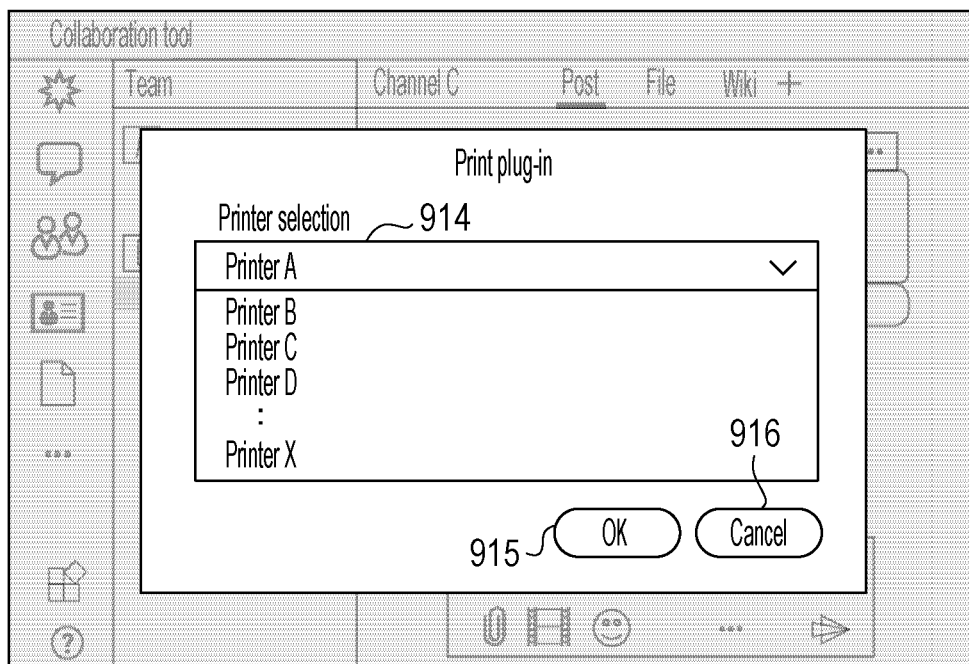
FIG. 8B is a diagram illustrating an example of a screen which the print plug-in causes the client terminal to display.
Figure 8C:
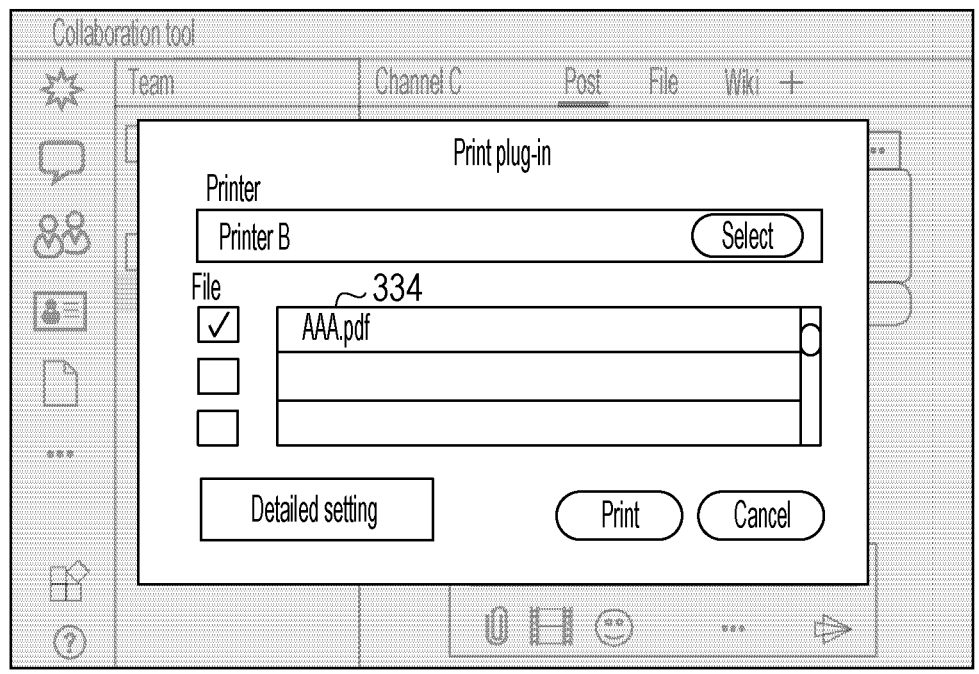
FIG. 8C is a diagram illustrating an example of a screen which the print plug-in causes the client terminal to display.
Figure 9:
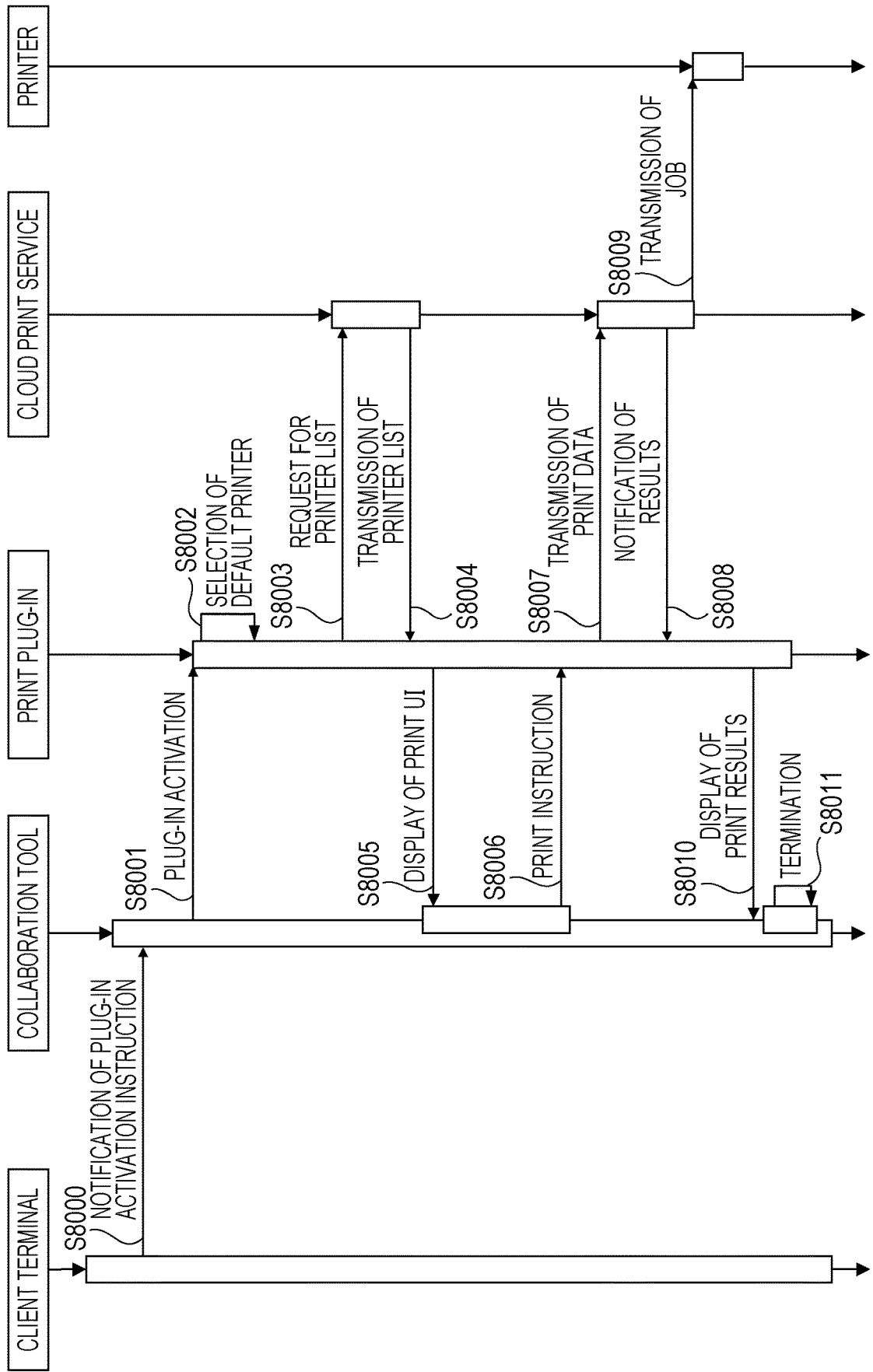
FIG. 9 is a diagram illustrating an example of a sequence of performing printing using the print plug-in according to an exemplary embodiment.

Next, with reference to FIGS. 7A, 7B, 8A, 8B, 8C, and 9, the transition of print UI display occurring when the print plug-in 600 is called up on the collaboration tool 300 will now be explained. FIGS. 7A, 7B, 8A, 8B, and 8C are diagrams illustrating screen transition up to printing using the print plug-in 600. FIG. 9 illustrates a sequence of processing up to printing. A case where the collaboration tool application installed in the client terminal 100 is used will be taken as an example here. Similar screen transition occurs in a case where an access to the collaboration tool 300 is made via the web browser installed in the client terminal 100, instead of using the collaboration tool application.

The user activates the collaboration tool application installed in the client terminal 100. The collaboration tool application displays an authentication screen and waits for an input of a user ID and password. The inputted user ID and password is transmitted to an authentication unit of the collaboration tool 300. If the authentication is successful, a collaboration tool screen is displayed. The collaboration tool application displays a screen illustrated in FIG. 7A. FIG. 7A is a diagram illustrating a chat room screen of a channel C to which the user who is logged in to the collaboration tool 300 belongs. In an area 900, a message posted by a user A and an attached file "AAA.pdf" are displayed. When the user selects the attached file "AAA.pdf", the collaboration tool application opens the attached file "AAA.pdf" and displays its content. To print the attached file "AAA.pdf", the user selects a three-dot leader 901. When the user selects the three-dot leader 901, a function selection UI 902 is displayed. Standard-function buttons and an "Other operation" button 903 are displayed in the function selection UI 902. When the user selects the "Other operation" button 903, an already-installed-application list UI 904 is displayed. A list of applications that have been installed using the method illustrated in FIG. 5 is displayed in the already-installed-application list UI 904.

When the user selects a print plug-in icon 905, the collaboration tool application notifies the collaboration tool 300 of the selection of this icon for plug-in application activation (S8000). The collaboration tool 300 activates the print plug-in 600 (S8001).

In S8002, the print plug-in 600 selects the default printer by comparing the network information acquired from the client terminal 100 with the default printer management table illustrated in FIG. 6. For example, the print plug-in selects printer information registered in the default printer management table in association with an IP address whose numerals at a predetermined number of digits counted from the head of its numeric string agree with those of the IP address acquired from the client terminal 100.

Next, the print plug-in 600 makes a request for a list of printers which the user is able to use to the cloud print service 500 (S8003). Upon receiving the request from the print plug-in 600, the cloud print service 500 transmits a list of printers which the user who is logged in to the collaboration tool 300 is able to use to the print plug-in 600 (S8004).

The print plug-in 600 generates a print UI by using the information of the default printer selected in S8002, and gives a display instruction to the collaboration tool 300 (S8005). In S8005, the collaboration tool 300 displays a print UI illustrated in FIG. 7B on the client terminal 100. In a printer area 906 illustrated in FIG. 7B, the printer name of the default printer selected in S8002 is displayed. In the present embodiment, the default printer is a printer to be default-selected on a screen which the print plug-in causes to be displayed first when the collaboration tool calls up the print plug-in. The printer name of the default printer varies depending on the IP address that is the network information of the client terminal 100. Suppose that, for example, an IP address whose initial part of a numeric string from the head is 172.23 is acquired as the network information when the user activates the print plug-in 600 from the office. In this case, among the printer names registered in the default printer management table, Printer A, the IP address of which is 172.23.123.11, is displayed as the printer name of the default printer. Suppose that an IP address whose initial part of a numeric string from the head is 160.24 is acquired as the network information when the user activates the print plug-in 600 from home. In this case, among the printer names registered in the default printer management table, Printer B is displayed as the printer name of the default printer. Besides the printer area 906, the print UI illustrated in FIG. 7B has a file area 907, which includes a list of names of print-target files acquired from the collaboration tool 300 and individual UIs for switching whether to perform printing or not for the respective file names. In addition, the print UI further has a "Detailed setting" button 908 for calling up a Web UI for making detailed print settings, a "Print" button 909 for starting cloud printing, and a "Cancel" button 910 for aborting the print setting. When the user selects the "Detailed setting" button 908, a print setting screen that is not illustrated is displayed. When the user selects the "Cancel" button 910, the display of the print setting UI ends, and the screen illustrated in FIG. 7A is displayed. When the user selects a printer selection ("Select") button 917 provided in the printer area 906, a printer selection UI illustrated in FIG. 8B is displayed. The printer selection UI displays a list of printers registered in the cloud print service 500 and includes a printer list UI 914 for receiving a selection made by the user, an "OK" button 915 for communicating the result of the user selection to FIG. 7B, and a "Cancel" button 916. Though it is assumed here that all of the printers registered in the cloud print service 500 are displayed in the printer list UI 914, depending on the number of the printers registered therein, it is hard for the user to find the target printer. For a solution, for example, location information used as the network information of the user may be compared with location information of each of the printers registered in the cloud print service 500 to limit selectable printers, based on their distances. Then, if the user selects the "OK" button 915, the result of the selection made in the printer list UI 914 is reflected to the printer name displayed in the printer area 906 illustrated in FIG. 7B. If the user selects the "Cancel" button 916, display switches to FIG. 7B without updating the information.

When the user presses the "Print" button 909, the print plug-in 600 transmits a print instruction that includes the print target file and detailed settings to a printer queue having already been registered in the cloud print service 500 (S8006).

The print plug-in 600 transmits print data to the virtual printer queue having been registered in the cloud print service 500 by using Web API (S8007). In this transmission, a JSON-format print job containing file format, file size, and detailed setting information, and stream-type data of the file acquired from the cloud storage service 400, are transmitted to the virtual printer queue.

The cloud print service 500 has a function of converting a part of the file format with a printable file format. The print plug-in 600 determines in advance whether the file format is a print-supported file format or not. If it is determined that the file format is a print-supported file format, the print plug-in 600 transmits the print data. If it is determined that the file format is not a print-supported file format, the print plug-in 600 displays, on a call-up-source chat screen, a non-illustrated message indicating that the file format is not a print-supported file format.

The cloud print service 500 having received the print data successfully notifies the print plug-in 600 of the successful reception (S8008). Based on the notification from the cloud print service, the print plug-in 600 updates the information about the printer that was used last in the printer management table illustrated in FIG. 6. The print plug-in updates the printer information of the printer that was used last and corresponds to the network information of the client terminal 100 and information on the date (and time) of the last use.

The cloud print service 500 transmits a print job to the printer and starts printing (S8009). At this time, in S8008, the print plug-in 600 displays a UI illustrated in FIG. 8A on the collaboration tool 300 to show the received result (S8010). The UI illustrated in FIG. 8A includes a message 911 as to whether the print processing has succeeded or failed, a "Continue" button 912 for continuing the print operation, and an "End" button 913 for ending the print operation. The UI illustrated in FIG. 7C is displayed again when the user selects the "Continue" button 912.

The print plug-in 600 terminates when the user presses the "End" button 913 (S8011).

Registration of Default Printer

With reference to a flowchart of FIG. 10, processing performed by the print plug-in 600 regarding default printer registration explained with reference to FIG. 4 will now be explained in detail. Each processing illustrated in the flowchart of FIG. 10 is performed by a CPU 611 of the print plug-in 600.

The CPU 611 receives the printer information (the printer name and the printer ID) contained in the QR code scanned by the user from the collaboration tool 300 (S9000). In addition to the printer name and the printer ID that are contained in the QR code, the CPU 611 receives the user ID of the user who posted the message for default printer registration.

The print plug-in 600 analyzes the received information to take out the printer name and the printer ID separately (S9001).

The CPU 611 acquires, from the cloud print service 500, a list of printers which the user corresponding to the user ID received in S9001 is able to use (S9002). The cloud print service 500 notifies the print plug-in 600 of the list of printers registered in association with the user ID of the user notified from the print plug-in 600.

The CPU 611 determines whether the printer corresponding to the printer name and the printer ID notified from the collaboration tool 300 in S9001 is contained in the list of printers acquired in S9002 or not (S9003). If the printer name and the printer ID notified from the collaboration tool 300 are not contained in the list of printers acquired from the cloud print service 500, the CPU 611 transmits an error message to the collaboration tool 300 (S9004). The collaboration tool 300 causes the display unit of the client terminal 100 to display the error message notified from the print plug-in 600. The processing in S9004 is processing performed when, though the user has attempted to perform default printer registration after scanning the QR code, the user is not permitted to use this printer.

Next, processing performed in S9003 in a case where the printer name and the printer ID notified from the collaboration tool 300 are contained in the list of printers acquired from the cloud print service 500 will now be explained.

The CPU 611 acquires the network information of the client terminal 100 (S9005). The print plug-in 600 inquires of the collaboration tool 300 about the IP address of the client terminal 100 operated by the user. The print plug-in 600 receives the IP address of the client terminal 100 from the collaboration tool 300.

Next, the CPU 611 calls up the default printer management table which it manages (S9006). The default printer management table is the table illustrated in FIG. 6.

The CPU 611 determines whether the printer name and the printer ID that correspond to the acquired network information are registered in the default printer management table or not (S9007). The CPU 611 compares numerals at a predetermined number of digits counted from the head of the numeric string of the acquired IP address of the client terminal 100 with numerals at a predetermined number of digits counted from the head of the numeric string of each IP address stored in the default printer management table, and determines whether there is a match or not. The determination in S9007 is processing for determining whether the default printer to be used when accessed from the network corresponding to the acquired network information is registered or not. In the present embodiment, it has been explained that the CPU 611 determines whether the numerals at the predetermined number of digits counted from the head of the numeric string of the former IP address agree with those of the latter IP address or not. It may be determined whether the entire string of the former IP address agrees with the entire string of the latter IP address or not.

In a case where it is determined that default printer information is not registered in the printer management table, the CPU 611 registers the network information in association with the printer information (the printer name and the printer ID) that has been received from the collaboration tool into the printer management table (S9009). In a case where it is determined that default printer information has already been registered, the CPU 611 overwrites the default printer information registered for the network information with the printer information (the printer name and the printer ID) that has been received from the collaboration tool 300 (S9008). Upon completion of updating the printer management table, the print plug-in 600 sends a notification of completion of default printer registration to the individual chat of the collaboration tool 300 (S9010).

In the present embodiment, in a case where the default printer corresponding to the acquired network information has already been registered, overwriting with the printer information is performed. In a case where the default printer corresponding to the acquired network information has already been registered, the CPU 611 may post a query message as to whether to update the default printer or not to the collaboration tool 300. The collaboration tool 300 causes the display unit of the client terminal 100 to display the notified message. When the user posts a message to the collaboration tool 300, the posted message is notified to the print plug-in 600. Based on the message received from the collaboration tool 300, the print plug-in 600 determines whether updating the default printer is instructed or not. In a case where it is determined that updating the default printer is instructed, the print plug-in 600 performs overwriting of the printer information in the default printer management table. In a case where updating the default printer is not instructed, the print plug-in 600 terminates the processing illustrated in FIG. 9 without updating the default printer management table.

Processing of Print Plug-In when Print Setting UI is Displayed

Next, with reference to a flowchart of FIGS. 11A and 11B, processing when printing is performed actually as illustrated in FIGS. 7 and 8 will now be explained.

In the print plug-in 600, default printer information is stored in the default printer management table. When the user activates the print plug-in 600 from the collaboration tool 300, the network information of the user is collated with the information in the printer management table to acquire the default printer information, and a print setting UI is displayed. With reference to FIGS. 11A and 11B, this processing will now be explained in detail.

Figure 11A:
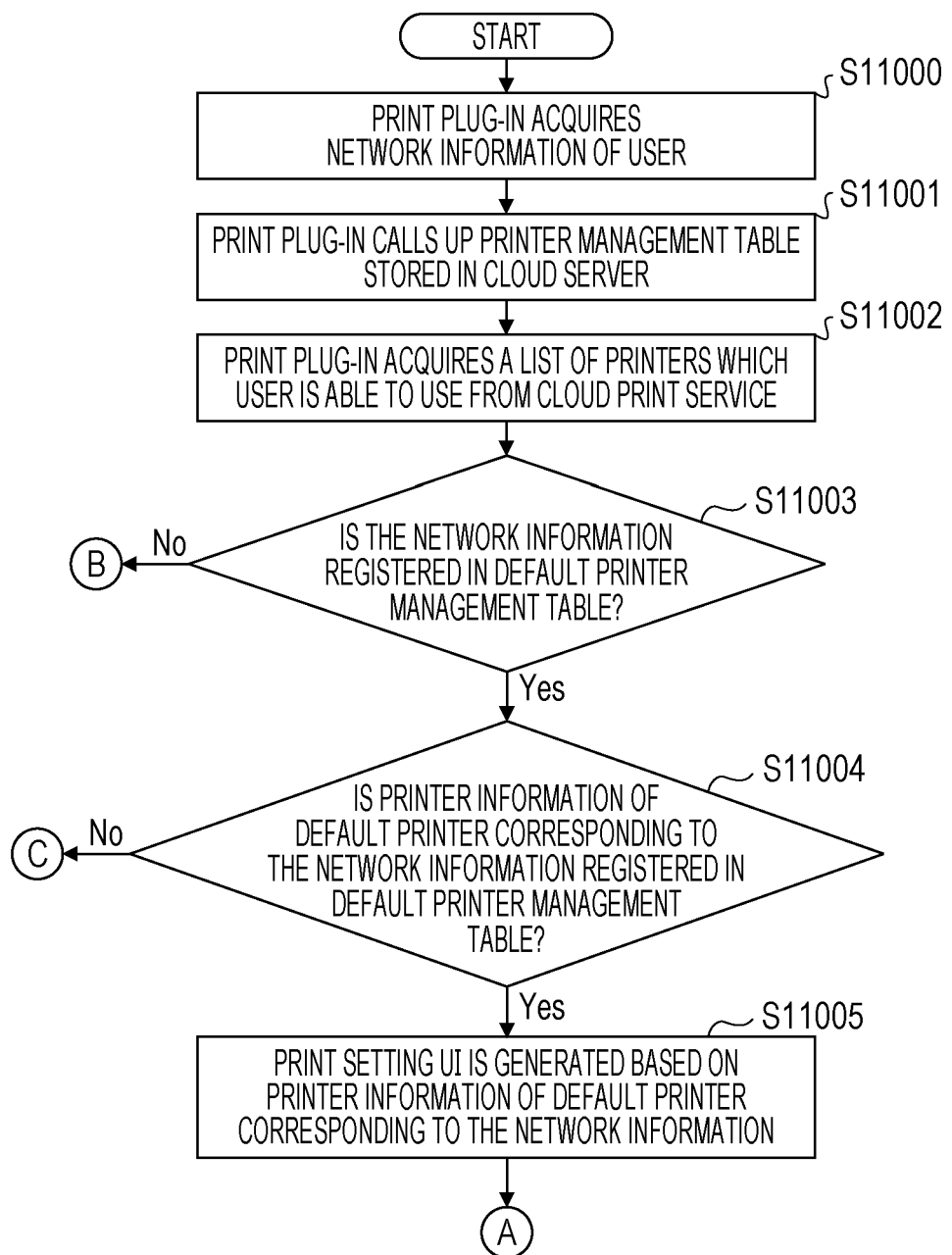
FIGS. 11A and 11B are a flowchart illustrating processing up to displaying a print setting UI by the print plug-in according to an exemplary embodiment.
Figure 11B:
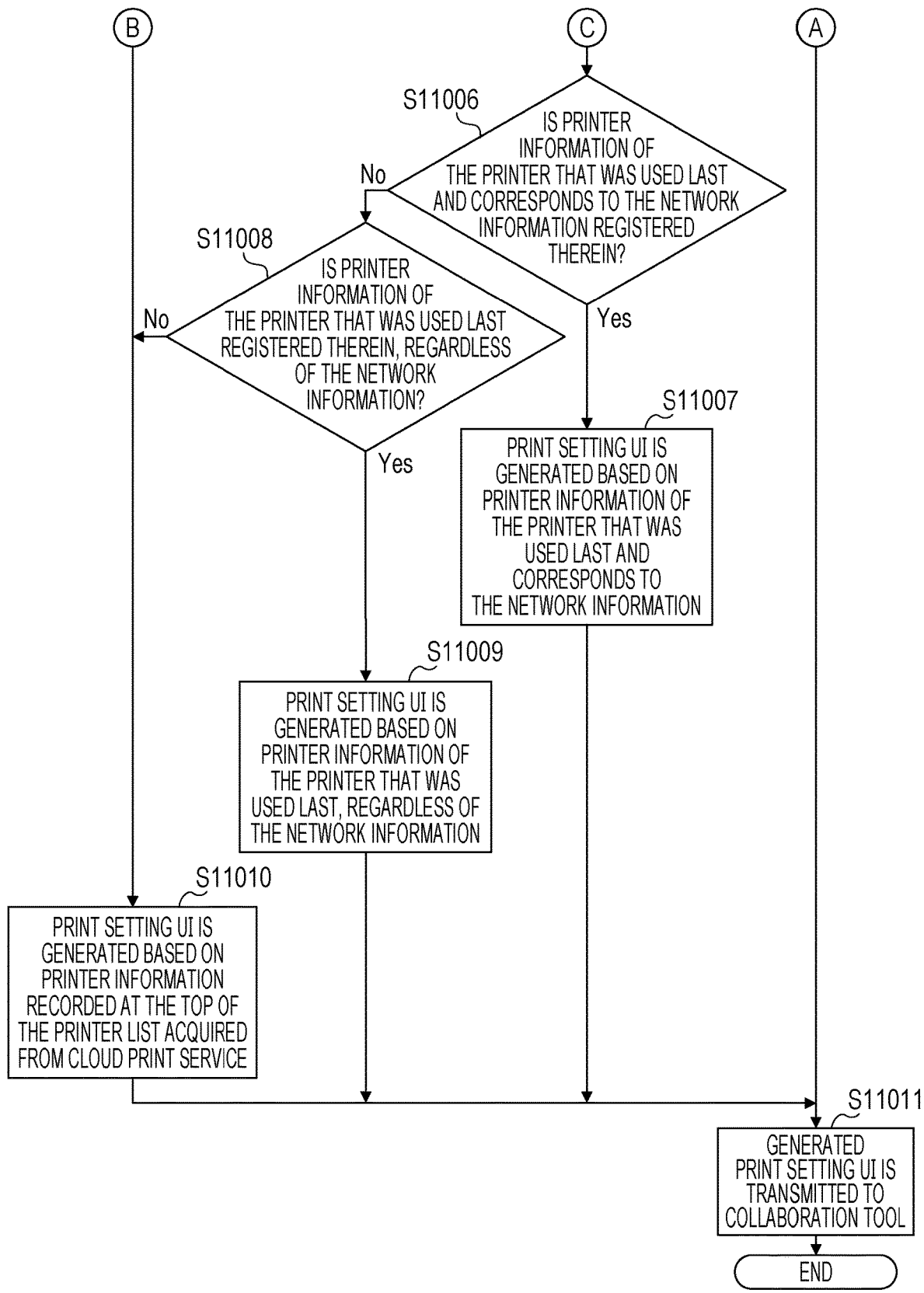

The processing illustrated in FIGS. 11A and 11B is performed by running a program by the CPU 611 of the print plug-in 600. The processing illustrated in FIGS. 11A and 11B is initiated based on selecting the print plug-in icon 905 illustrated in FIG. 7A by the user.

The CPU 611 acquires the network information of the client terminal 100 from the collaboration tool 300 (S11000). The processing in S11000 is similar to the processing in S9005 illustrated in FIG. 10. Specifically, in S11000, the print plug-in 600 makes a request for the IP address of the client terminal 100 to the collaboration tool 300, and acquires it.

After the above step, the CPU 611 calls up the default printer management table stored in the storage unit 614 (S11001).

The CPU 611 acquires a list of printers which the user is able to use from the cloud print service 500 (S11002). In S11002, the CPU 611 transmits a request for acquiring a list of printers and the user information to the cloud print service 500. In a case where a list of printers cannot be acquired from the cloud print service 500, though not illustrated, the CPU 611 posts an error message to the collaboration tool 300 and causes the client terminal 100 to display the error message. In this case, after posting the error notification, the CPU 611 terminates the processing illustrated in FIGS. 11A and 11B.

The CPU 611 determines whether the network information acquired in S11000 is registered in the default printer management table or not (S11003). In S11003, the CPU 611 determines whether there exists a registered IP address whose numerals at a predetermined number of digits counted from the head of its numeric string agree with those of the IP address acquired in S11000. Performing the determination in this way ensures that, even if the user gives a print instruction from a device that is different from the device that was used at the time of default printer registration, the same printer will be displayed as the default printer when the user demands printing within a certain area as in an office. In the present embodiment, it is determined whether numerals at a predetermined number of digits counted from the head of the numeric string of the IP address acquired from the client terminal agree with those of the IP address registered in the default printer management table or not. It may be determined whether the entire string of the former IP address agrees with the entire string of the latter IP address or not.

In S11003, if the acquired network information is not registered in the default printer management table, the CPU 611 performs processing in S11010. The CPU 611 generates a print setting screen in which printer information of the printer at the top of the printer list acquired in S11002 is taken as the default printer information (S11010).

If the network information is registered in the default printer management table, the CPU 611 performs processing in S11004. In S11004, the CPU 611 determines whether the printer information of the default printer corresponding to the network information acquired in S11000 has been written in the default printer management table or not. In S11004, the CPU 611 determines whether there exists default printer information registered in the default printer management table in association with an IP address whose numerals at a predetermined number of digits counted from the head of its numeric string agree with those of the IP address of the client terminal 100 or not. For example, suppose that the IP address of the client terminal 100 is "172.23.999.88". In this case, the printer whose IP address registered in the default printer management table is "172.23.123.11", whose printer name is "Printer A", and whose printer ID is "Id123", is selected as the default printer. Suppose that the IP address of the client terminal 100 is "160.24.111.22". In this case, the IP address "160.24.987.65", the printer name "Printer B", and the printer ID "Id128", are selected as the printer information of the default printer. It may be determined whether the IP address acquired from the client terminal agrees perfectly with the IP address managed in the default printer management table or not.

If the IP address of the client terminal 100 is "155.10.987.66", the CPU 611 determines that the printer information of the default printer corresponding thereto is not registered therein.

If the printer information of the default printer corresponding to the network information is registered, the CPU 611 generates a print setting UI based on the printer information of the default printer corresponding to the network information (S11005). In S11005, the CPU 611 generates a print setting UI whose printer area 906 illustrated in FIG. 7B displays the printer information of the default printer corresponding to the network information.

If it is determined in S11004 that the printer information of the default printer corresponding to the network information of the client terminal 100 is not registered, the CPU 611 performs processing in S11006. The CPU 611 determines whether the printer information of the printer that was used last and corresponds to the network information of the client terminal 100 is registered in the default printer management table or not (S11006). In S11006, the CPU 611 determines whether the printer information of the printer that was used last and corresponds to an IP address whose numerals at a predetermined number of digits counted from the head of its numeric string agree with those of the IP address of the client terminal 100 is registered therein or not. For example, if the IP address of the client terminal 100 is "155.10.987.66", the printer whose IP address "155.10.111.22", whose printer name is "Printer C", and whose printer ID is "Id124", is the printer that was used last.

The CPU 611 generates a print setting UI whose default printer information is the printer information of the printer that was used last and corresponds to the network information (S11007). For example, if the IP address of the client terminal 100 is "155.10.987.66", a print setting UI displaying "Printer C" in the printer area 906 illustrated in FIG. 7B is generated.

If the network information is registered but neither the information of the default printer corresponding thereto nor the information of the printer of the latest use is registered, the CPU 611 performs processing in S11008. The CPU 611 generates a print setting UI in which, regardless of the network information of the client terminal 100, the printer that was used last by the user who is logged in to the collaboration tool 300 is set as the default printer (S11008). In S11008, the information on the date of the last use in the table illustrated in FIG. 6 is used. The date of the last use is the date on which print data was transmitted last to the printer that was used last. In S11008, the CPU 611 refers to the information on the date of the last use in the default printer management table and generates a print setting UI in which the printer having the most recent date information is set as the default printer. For example, in the default printer management table illustrated in FIG. 6, the printer whose printer name is "Printer C" and whose printer ID is "Id124" is selected as the default printer, and the screen illustrated in FIG. 7B is generated.

If the printer information of the printer that was used last is not registered in the default printer management table, the CPU 611 advances the process to S11010.

The CPU 611 transmits the print setting UI generated in S11005, S11007, S11009, or S11010 to the collaboration tool 300 (S11011). The collaboration tool 300 causes the client terminal 100 to display the print setting UI received from the print plug-in 600.

By this means, it is possible to cause the client terminal to display a print setting UI containing, as its default value, printer information that differs depending on where the client terminal is located at the timing of displaying the print setting UI by the print plug-in.

In the first embodiment, a two-dimensional code (QR code) in which information such as the printer name, the printer ID, the identifier of the print plug-in 600, etc. is written is printed, the QR code is affixed to the printer, and the user captures an image of the QR code with the client terminal 100. The printer 200 may display, on its display unit 215, a QR code in which information such as the printer name, the printer ID, the identifier of the print plug-in 600, etc. is written. In this case, in S4007 of FIG. 4, the user operates the printer 200 to cause the display unit 215 to display the QR code, and then scans the QR code by using the client terminal 100. Operations after this step are the same as those of the first embodiment.

Second Embodiment

In the first embodiment, an example of scanning a QR code affixed to the body of a printer and then performing default printer registration has been described. In the second embodiment, an example of performing default printer registration by using the collaboration tool 300 will be described. The second embodiment makes it possible to set a default printer without any need for printing a QR code or the like.

First, with reference to FIG. 12, the operation of the client terminal 100 according to the second embodiment will now be explained.

Figure 12A:
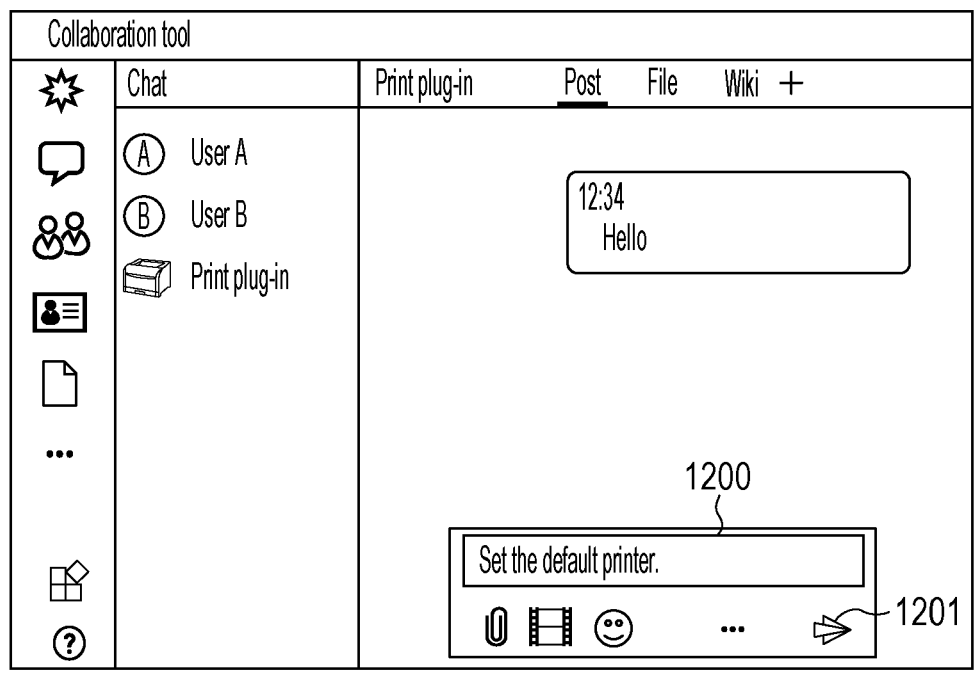
FIG. 12A is a diagram illustrating an example of a screen for setting the default printer by the print plug-in according to a second embodiment.

FIG. 12(A) illustrates a chat screen displayed by the collaboration tool application installed in the client terminal 100. It is assumed that the installing of the print plug-in explained earlier with reference to FIG. 5 has already been done. FIG. 12A illustrates a chat room for users and the print plug-in. When the user posts a message, the posted message is transmitted to the collaboration tool 300, and the collaboration tool 300 notifies the print plug-in 600 of the received message. In the second embodiment, in order to set a default printer, the user enters "Set the default printer" in a message input area 1200, and selects a "Post" button 1201. The print plug-in 600 receives the posted message, and displays a printer list screen illustrated in FIG. 12B. The printers displayed in the print list are printers registered in the cloud print service 500 as those which the user is able to use. The user operates a printer selection area 1202 to select a printer which the user wants to register as the default printer. An "OK" button 1203 is a button for a user instruction for registering the selected printer as the default printer. A "Cancel" button 1204 is a button for terminating setting the default printer. When the "Cancel" button 1204 is selected, the printer list disappears, and the chat screen illustrated in FIG. 12A appears.

Figure 13:
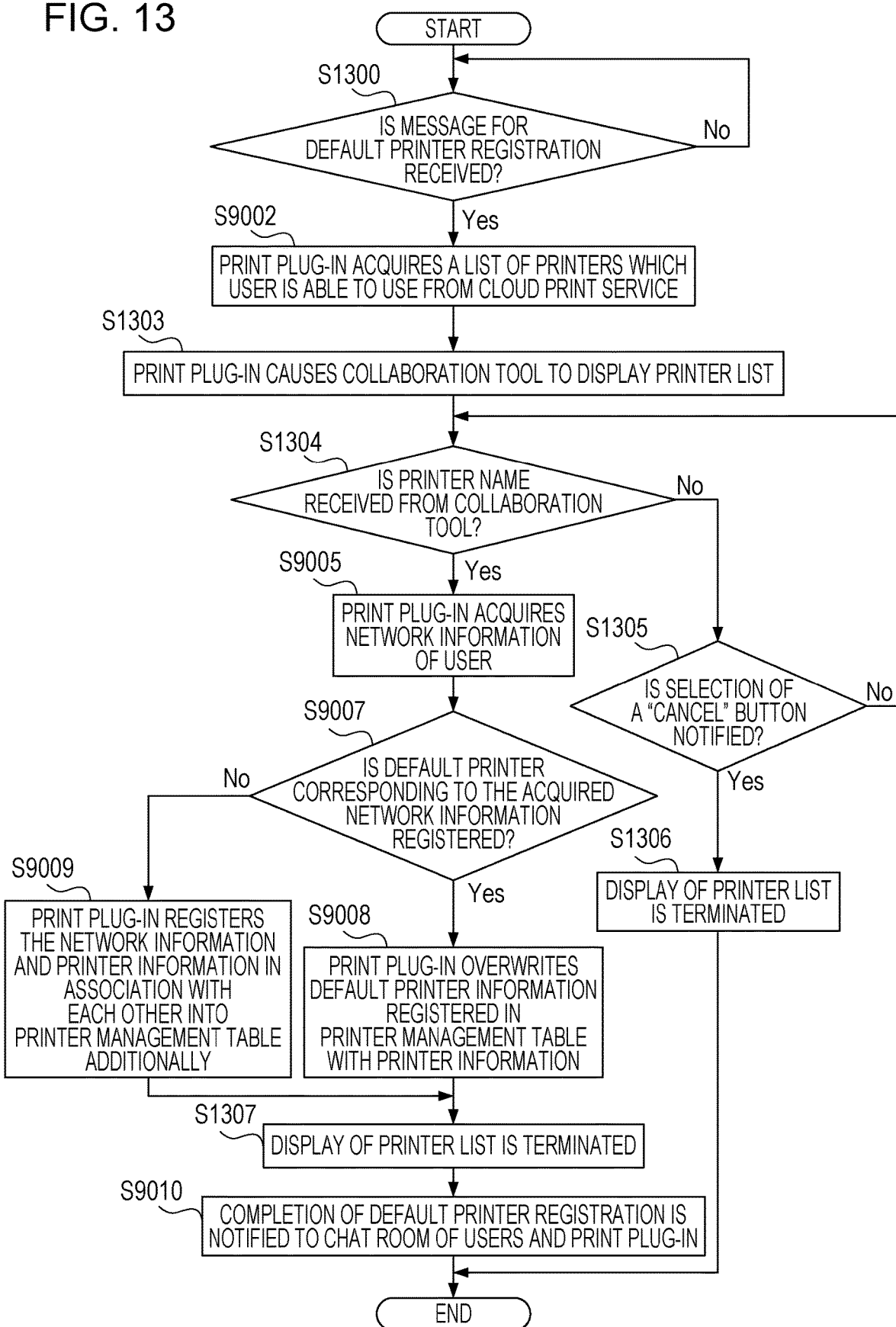
FIG. 13 is a flowchart illustrating processing for registering the default printer according to the second embodiment.

Next, with reference to FIG. 13, processing performed by the print plug-in 600 in the second embodiment will now be explained. Each processing illustrated in FIG. 13 is performed by running a program by the CPU 611. The process illustrated in FIG. 13 corresponds to the process illustrated in FIG. 10. The same reference signs as those used in FIG. 10 will be used for the same processing in FIG. 13, and an explanation of the same processing will not be given below.

The CPU 611 determines whether a message for default printer registration is received from the collaboration tool 300 or not (S1300). Based on the content of the message received from the collaboration tool 300, the CPU 611 determines whether the message is a message for default printer registration or not. For example, the CPU 611 determines that the received message is a message for default printer registration if it contains a predetermined keyword. If a message for default printer registration is not received, the CPU 611 repeats the processing in S1300.

The CPU 611 acquires a list of printers which the user is able to use from the cloud print service 500 (S9002). The processing in S9002 is the same as the processing in the corresponding step of the first embodiment.

The CPU 611 causes the collaboration tool 300 to display the acquired printer list (S1303). As a result of this processing, the screen illustrated in FIG. 12B appears on the display unit of the client terminal 100.

The CPU 611 determines whether a printer name is received from the collaboration tool 300 or not (S1304). On the screen illustrated in FIG. 12B, the user selects the name of a printer which the user wants to set as the default printer, and then selects the "OK" button 1203. The printer name to be registered as the default printer is notified from the client terminal 100 to the print plug-in 600 via the collaboration tool 300. If a printer name is not received from the collaboration tool 300, the CPU 611 advances the process to S1305. The CPU 611 determines whether the "Cancel" button 1204 is selected on the screen illustrated in FIG. 12B or not (S1305).

Figure 12B:
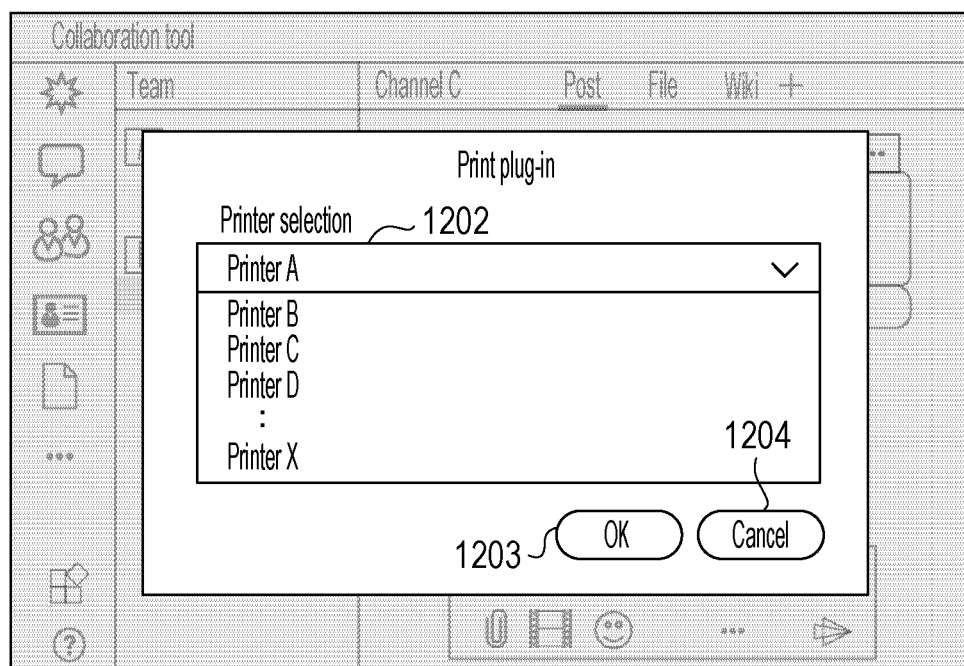
FIG. 12B is a diagram illustrating an example of a screen for setting the default printer by the print plug-in according to the second embodiment.

When the "Cancel" button 1204 is selected on the screen illustrated in FIG. 12B, the CPU 611 terminates the display of the printer list illustrated in FIG. 12B (S1306). Accordingly, the screen displayed on the client terminal 100 switches to the chat screen illustrated in FIG. 12A.

If the "Cancel" button is not selected in S1305, the CPU 611 returns the process to S1304.

If a printer name is received from the collaboration tool 300 in S1304, the CPU 611 acquires the network information of the client terminal 100 (S9005). Since this processing is the same as that of S9005 of FIG. 10 according to the first embodiment, an explanation of this processing is omitted.

Figure 10:
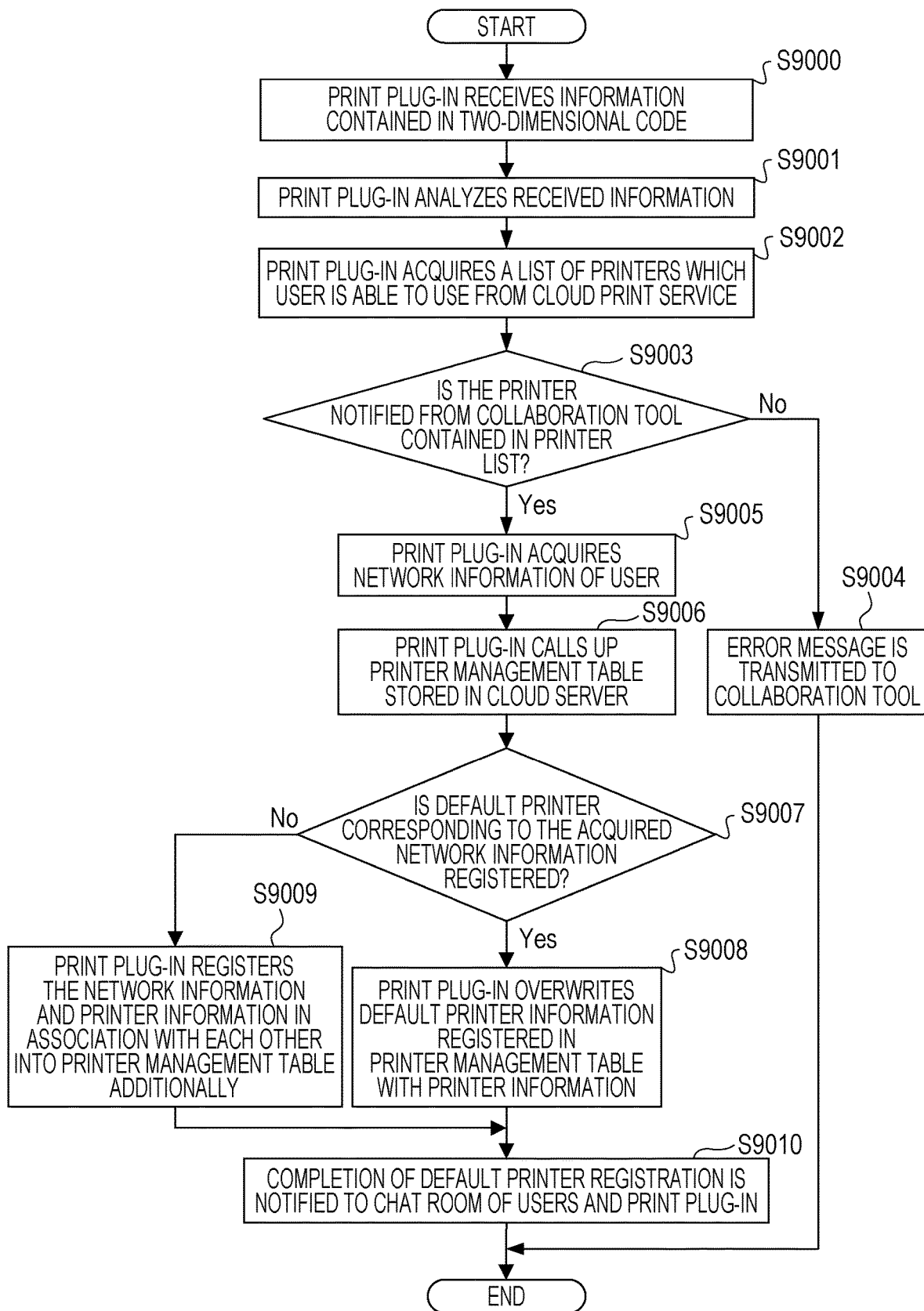
FIG. 10 is a flowchart illustrating processing for registering the default printer by the print plug-in according to the first embodiment.

Then, the CPU 611 performs the processing in S9007 to S9009 of FIG. 10 according to the first embodiment.

Upon completion of writing the default printer information into the default printer management table, the CPU 611 terminates the display of the printer list illustrated in FIG. 12B (S1307). The processing illustrated in S1307 is performed when the CPU 611 commands the collaboration tool 300 to terminate the display of the printer list.

The CPU 611 notifies the chat room for the users and the print plug-in of the completion of default printer registration (S9010). This processing is the same as that of S9010 of FIG. 10 according to the first embodiment.

The same processing as the print processing explained earlier with reference to FIGS. 11A and 11B in the first embodiment is performed in the second embodiment; therefore, an explanation of it is omitted.

Executing the above series of steps enables default printer registration even when it is impossible to print a QR code or when it is impossible to scan a QR code by using the client terminal 100.

In the second embodiment, it has been described that default printer registration is initiated by posting a predetermined message by the user to a chat room for interaction with the print plug-in. An object for default printer registration may be provided on the chat room illustrated in FIG. 12A, and the process illustrated in FIG. 13 may be executed in response to selecting the object by the user.

In the second embodiment, it has been described that a list of printers which the user is able to use is displayed in response to posting a predetermined message by the user, and the printer selected from among those in the printer list is registered as the default printer.

Figure 14:
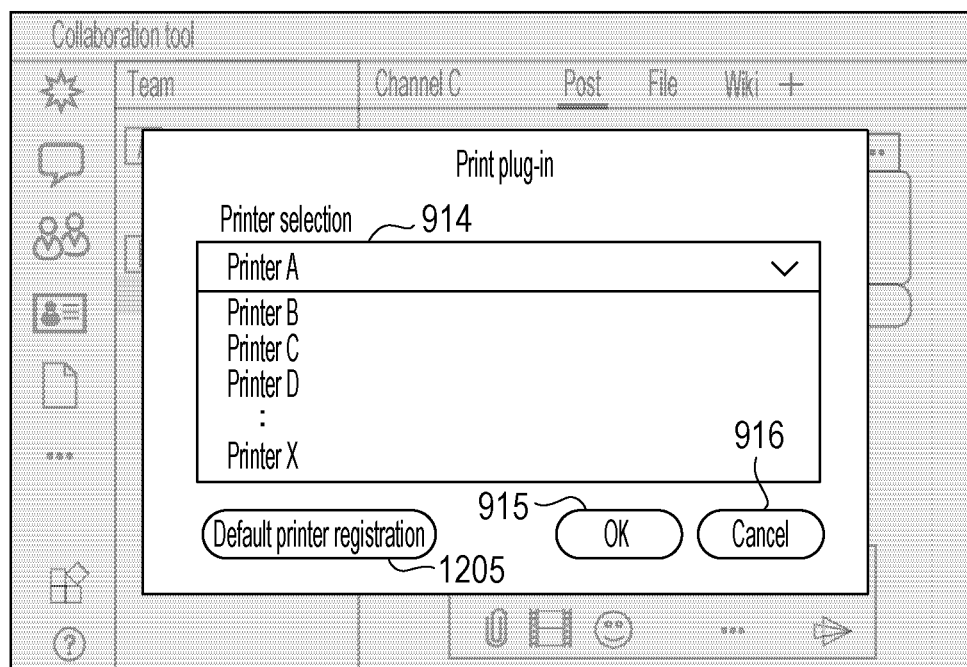
FIG. 14 is a diagram illustrating an example of a screen for selecting the default printer according to the second embodiment.

A screen illustrated in FIG. 14 may be displayed when the user selects the printer selection button 917 after calling up the print plug-in by operating the icon 905 illustrated in FIG. 7A, and default printer registration may be performed on this screen. The difference between the screen illustrated in FIG. 14 and the screen illustrated in FIG. 8B will now be explained. As is the case with FIG. 8B, the screen illustrated in FIG. 14 is a screen for selecting a printer that is to be used for printing. The screen illustrated in FIG. 14 includes a default printer registration button 1205, which is not included in the screen illustrated in FIG. 8. From among the printers displayed in the printer list UI 914, the user selects a printer which the user wants to register as the default printer, and then selects the default printer registration button 1205. When the default printer registration button 1205 is selected, the processing in S9005 and the subsequent steps of FIG. 13 is executed. When the default printer is registered by operating the default printer registration button 1205, after the registration processing, a print setting UI whose printer area 906 illustrated in FIG. 7B displays the printer name of the registered default printer is displayed. If the user selects the "OK" button 915 illustrated in FIG. 14, default printer registration is not performed, and only the printer information of the printer that is to be used for printing is changed.

By this means, it is possible to register the default printer during screen transition for printing.

Third Embodiment

In the first embodiment described earlier, the print plug-in 600 performs default printer registration and acquisition by using the network information acquired from the collaboration tool 300. However, depending on the specification of the collaboration tool 300, it could happen that the network information acquired from the collaboration tool 300 by the print plug-in 600 is not the network information of the client terminal 100 but the server information of the collaboration tool 300. For a solution, in the third embodiment, the print plug-in 600 acquires the network information of the client terminal 100 from another service, which is not the collaboration tool 300.

In the first embodiment, it has been described that the collaboration tool 300 performs authentication processing for a login to the collaboration tool 300. In the present embodiment, it is assumed that an access management service for managing authentication processing for logging in to the collaboration tool 300 and the cloud storage service 400 and managing user access logs is provided separately from the collaboration tool 300. An example of the access management service is Azure Active Directory provided by Microsoft Corporation. In the third embodiment, default printer registration and acquisition is performed by using network information contained in the latest sign-in log of the user managed by means of access management information. This makes it possible to select a default printer identified by the network information of the client terminal even in a case where the network information of the client terminal cannot be acquired from the collaboration tool 300.

The access management service configured to control accesses to the collaboration tool 300 and control access authority for accessing data stored in the cloud storage service 400 is connected to the network 700.

The access management service manages and monitors accesses to the collaboration tool 300 and the cloud storage service 400. The access management service records, as a sign-in log, information about account authentication that was performed so as to authorize the user to access resources. The resources mean content provided by the collaboration tool 300, files stored in the cloud storage service 400, and the like.

The sign-in log records the user ID, which is identification information of the user, sign-in time at which the user signed in, device information of the client terminal 100 operated by the user, the IP address and location information thereof, etc. The device information of the client terminal 100 includes the type of operating system of the client terminal 100, the type of a web browser that was used at the time of sign-in, and the like. The location information is information corresponding to geoCoordinates, which will be described later. The location information indicates the latitude and longitude of the client terminal 100.

The user is able to confirm the sign-in log by accessing the access management service via the web browser installed in the client terminal 100. In addition, it can be acquired as JSON data by accessing the access management service from the client terminal 100 or the print plug-in 600 and by using WebAPI.

In the third embodiment, a case where the IP address is used as the network information will be described. However, any other information by means of which it is possible to pinpoint the location of the client terminal 100, for example, GPS information, may be used instead. The network and hardware configuration, the installing of the collaboration tool application, the transition of the UI displayed by the print plug-in, the management of the default printer, etc. in the third embodiment are the same as those of the first embodiment. Therefore, an explanation of them is omitted.

First, regarding default printer registration, it is assumed that the default printer is registered via the UI illustrated in FIG. 12B as done in the second embodiment. The user operates the printer selection area 1202 to select a printer which the user wants to register as the default printer. The method disclosed in the first embodiment may be used for registering the default printer.

When the "OK" button 1203 is selected by the user, the collaboration tool 300 notifies the print plug-in 600 of information on the printer selected in the printer selection area 1202, the selection of the "OK" button 1203, and the identification information of the user who accesses the collaboration tool 300.

Upon receiving the notification, the print plug-in 600 acquires the latest sign-in log of the user who is logged in to the collaboration tool 300 from the access management service by using WebAPI. It is assumed that the print plug-in 600 pre-stores a URL for accessing the access management service and WebAPI to be used for acquiring the information.

The print plug-in 600 extracts network information included in the sign-in log acquired from the access management service. In the third embodiment, it is assumed that the IP address is extracted as the network information.

The print plug-in 600 registers the printer information selected in the printer selection area 1202 by the user and the IP address in association with each other into the default printer management table.

The timing of acquiring the IP address by the print plug-in 600 may be the timing of displaying the UI illustrated in FIG. 12B by the print plug-in 600. In this case, the print plug-in 600 generates screen information illustrated in FIG. 12B, with an IP address acquisition request contained in it, and transmits it to the collaboration tool 300. Upon acquiring the screen information, the collaboration tool 300 processes the received screen information, thereby generating the screen illustrated in FIG. 12B and performing processing for acquiring the IP address of the client terminal. The processing for acquiring the IP address is the same as the processing explained earlier, and the network information is extracted from the sign-in log acquired from the access management service accessed using WebAPI.

The acquired IP address is notified to the print plug-in 600 together with the printer information selected on the screen illustrated in FIG. 12B by the user. The print plug-in 600 registers the IP address notified from the collaboration tool 300 and the printer information in association with each other into the default printer management table.

The UI illustrated in FIG. 12B is JSON-format data comprised of objects such as the "OK" button 1203 for performing particular actions. Some of the objects may contain URLs and character strings as their data in addition to title and action type as action information. Therefore, it is possible to display the UI of FIG. 12B that contains the IP address by adding the IP address acquired immediately before it as the data of the "OK" button 1203 when the print plug-in 600 reads UI data that is in the JSON format. When the user presses the "OK" button 1203, the IP address is also transmitted to the print plug-in 600, together with the selected printer information.

The default printer may be associated with the IP address by the following method. For example, when the print plug-in 600 is called up on the collaboration tool 300, the collaboration tool 300 transmits an activation instruction and the user information of the user who has given the activation instruction to the print plug-in 600. By using the user information notified from the collaboration tool 300, the print plug-in 600 acquires the latest sign-in log of the user from the access management service. The IP address contained in the acquired log is stored in association with the user identification information notified from the collaboration tool 300. When a default printer registration request is received from the collaboration tool 300, the print plug-in 600 stores the notified default printer information in association with the user identification information and the IP address.

Next, with reference to a print sequence chart of FIG. 15, a flow from acquisition of the default printer to printing by using the access management service will now be explained.

When the user selects the print plug-in icon 905, the collaboration tool application notifies the collaboration tool 300 of the selection of this icon for print plug-in activation (S8000). The collaboration tool 300 activates the print plug-in 600 (S8001).

The print plug-in 600 makes a request for the latest sign-in log to the access management service by using WebAPI (S1400). Upon receiving the request from the print plug-in 600, the access management service transmits the latest sign-in log that is in a JSON format illustrated in FIG. 16 to the print plug-in 600 (S1401). Upon receiving the sign-in log, the print plug-in 600 takes the value of the IP address out of "ipAddress" 1300 of the sign-in log information that is in the JSON format (S1402). The IP address acquired in this step is a global IP address. Besides the IP address, the sign-in log information illustrated in FIG. 16 contains, for example, "geoCoordinates" 1301 as network information by means of which it is possible to pinpoint the location of the client terminal 100. Therefore, this information may be used as information for determining the default printer in the subsequent step. The information "geoCoordinates" 1301 expresses the location of the client terminal in terms of latitude and longitude.

Then, the print plug-in 600 compares the acquired IP address with each IP address registered in the default printer management table illustrated in FIG. 6 to select a printer that is to be displayed as the default printer (S1403). In the IP address comparison, IP address conversion from a decimal format into a binary format is performed, and then a digit-by-digit comparison is performed sequentially, beginning with the highest-order digit, and the printer associated with the IP address whose numerals at a predetermined number of digits counted from the head of its numeric string agree therewith is determined as the default printer. If two or more candidate printers are found as a result of the comparison, a further comparison may be performed for lower-order digits until the default printer can be determined. The flow S8003 to S8011 after the determination of the default printer by the print plug-in 600 is the same as that of the first embodiment and is therefore not explained here.

Figure 15:
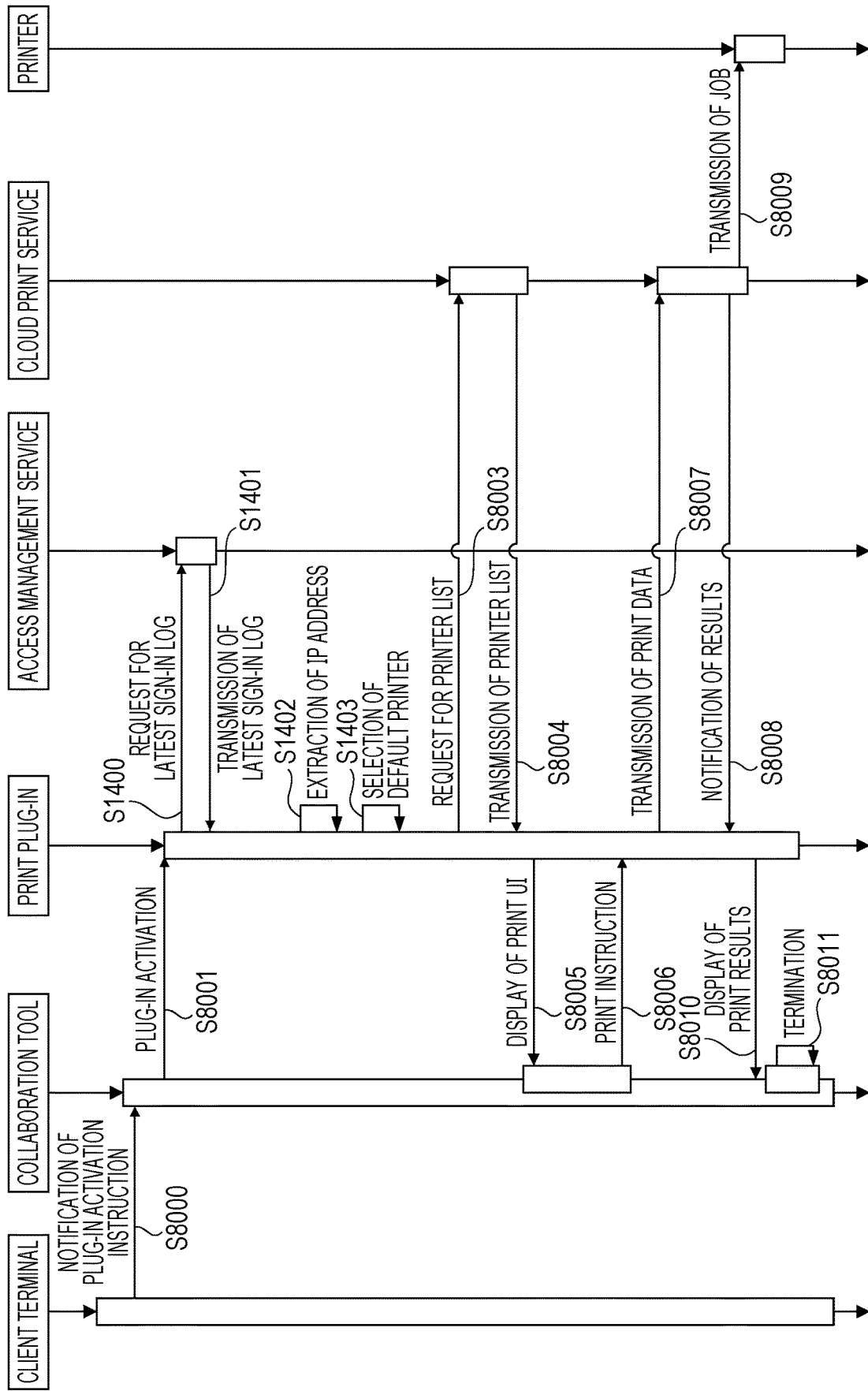
FIG. 15 is a diagram illustrating an example of a sequence of performing printing using the print plug-in according to a third embodiment.

In FIG. 15, it has been described that the processing in S1400 to S1403 is performed by the print plug-in. Alternatively, the print plug-in may provide the collaboration tool with an HTML or a JavaScript including a program for execution of S1400 to S1403. In this case, the collaboration tool performs processing corresponding to S1400 to S1403 by running a program received from the print plug-in.

In FIG. 15, the collaboration tool is illustrated as an independent service that is separated from the client terminal. However, the processing performed by the collaboration tool in FIG. 15 may be performed by the collaboration tool application installed in the client terminal.

Figure 17B:
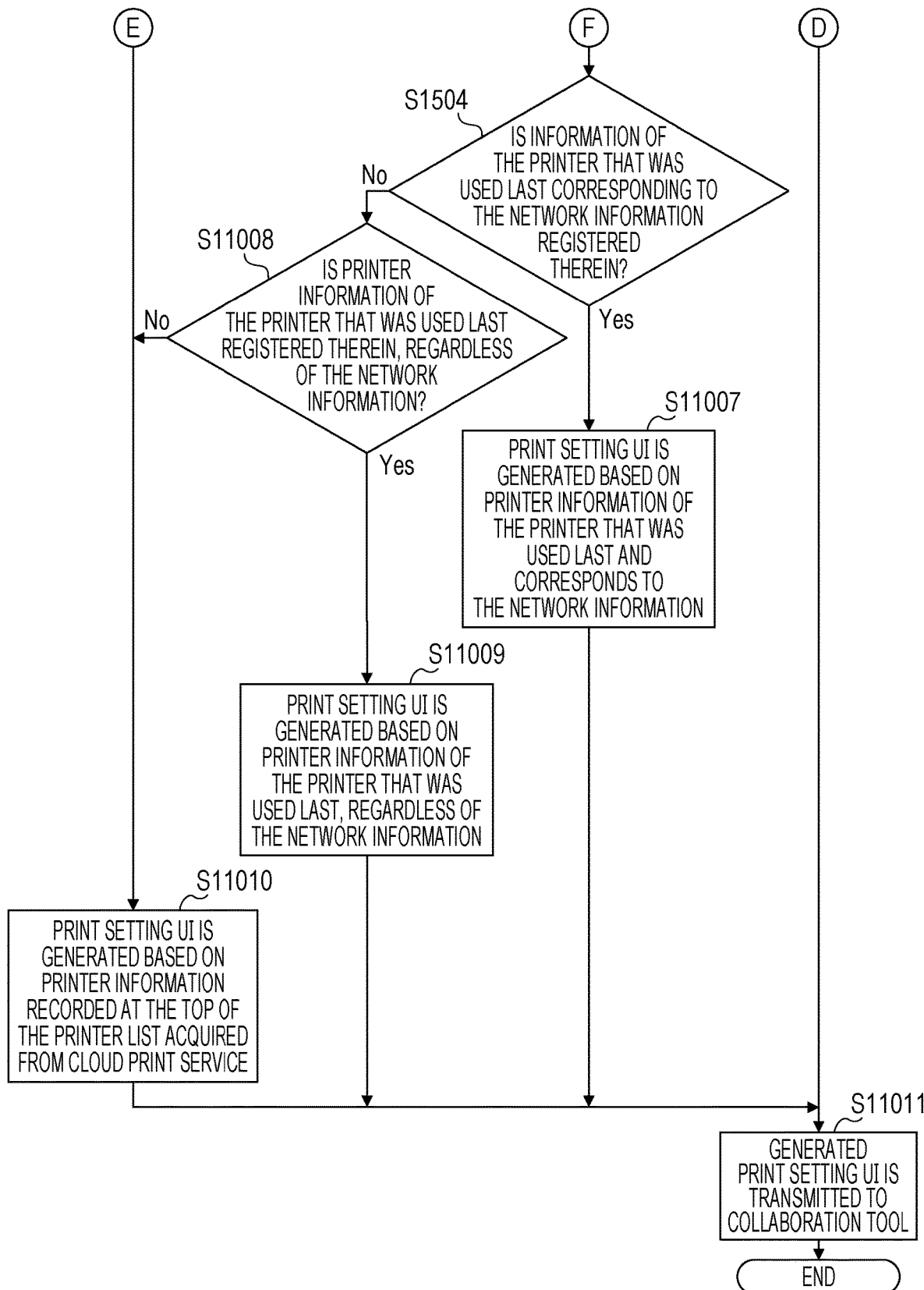

Finally, with reference to FIGS. 17A and 17B, default printer acquisition processing performed by the print plug-in 600 will now be explained in detail. The processing illustrated in FIGS. 17A and 17B is performed by running a program by the CPU 611 of the print plug-in 600. The processing illustrated in FIGS. 17A and 17B is initiated based on selecting the print plug-in icon 905 illustrated in FIG. 7A by the user.

The CPU 611 acquires the latest sign-in log of the user from the access management service (S1500). The processing in S1500 is the same as the processing in S1400 and S1401 of FIG. 15; that is, the print plug-in 600 makes a request for the latest sign-in log to the access management service and acquires it by performing WebAPI. The CPU 611 analyzes the acquired sign-in log and extracts the IP address as the network information of the client terminal 100 from it (S1501). Location information contained in the sign-in log may be acquired in addition to the IP address. After the above step, the CPU 611 calls up the default printer management table stored in the storage unit 614 as done in FIG. 11A (S11001). In addition, the CPU 611 acquires a list of printers which the user is able to use from the cloud print service 500 (S11002).

After acquiring the information, the CPU 611 determines whether the default printer associated with the IP address or the printer that was used last is registered in the default printer management table or not (S1502).

If it is determined in S1502 that the printer information is not registered, the CPU 611 performs processing in S11010. If the IP address is registered in the default printer management table, the CPU 611 performs processing in S1503.

In S1503, the CPU 611 determines whether default printer information corresponding to the IP address acquired in S1501 has been written in the default printer management table or not. In S1503, the CPU 611 determines whether there exists default printer information registered in the default printer management table in association with an IP address whose numerals at a predetermined number of digits counted from the head of its numeric string agree with those of the IP address of the client terminal 100 or not. In this step, as done in the processing in S1403 of FIG. 15, IP address conversion into a binary format may be performed, and then a numeric comparison for a predetermined number of digits counted from the head of its numeric string may be performed.

If it is determined in S1503 that the default printer is not registered, it is determined in S1504 whether the information of the printer that was used last is registered. The CPU 611 may perform the same determination as that of the first embodiment. Alternatively, the CPU 611 may perform IP address conversion into a binary format, and then perform a numeric comparison for a predetermined number of digits counted from the head of its numeric string. The other processing S11005 and S11007 to S11011 is the same as that of the first embodiment and is therefore not explained here.

As described above, in the third embodiment, the IP address of the terminal which the user used at the time of logging in to the service provided by the collaboration tool is acquired from the access management service configured to perform integrated management of the log of the user accessing the collaboration tool and the cloud print service. By this means, even in a case where the print plug-in cannot acquire the IP address of the terminal operated by the user from the collaboration tool directly, it is possible to estimate the IP address and location information of the terminal operated by the user. Therefore, it is possible to present, to the user, a printer suitable for the location of the user as the default printer.

In the third embodiment, the login information of the user is acquired from the service configured to control accesses to the collaboration tool 300 and control access authority for accessing data stored in the cloud storage service 400. Then, the disclosed system selects the default printer by using the IP address contained in the acquired login information.

Instead of providing a server configured to manage the login information of the user, a service capable of acquiring the IP address of the client terminal used by the user may be constructed on a server. The print plug-in 600 may acquire the IP address of the client terminal by using the service and may display the printer corresponding to the IP address as the default printer.

OTHER EMBODIMENTS

In the first and second embodiments, the client terminal 100 inquires of the collaboration tool 300 about the IP address of the client terminal 100 to acquire the network information of the client terminal 100. In the third and fourth embodiments, the print plug-in 600 performs communication in cooperation with another service to acquire the network information of the client terminal 100. Any other method may be used for acquiring the IP address that is the network information of the client terminal 100.

For example, the print plug-in 600 may generate an HTML or a JavaScript containing a command for acquiring the IP address of the client terminal 100 and may cause the collaboration tool 300 to run this program.

With reference to the drawings of the first embodiment, operation performed when this alternative method is used will now be explained. For example, after the scanning of a QR code by using the client terminal 100 in S4007 of the default printer registration processing in FIG. 4, the message illustrated in FIG. 5D is posted to the collaboration tool. The collaboration tool notifies the print plug-in of the posted message. The print plug-in determines whether the received message contains a predetermined message indicating default printer registration or not. If it is determined that the received message contains a predetermined message, the print plug-in generates an HTML that includes a command for acquiring the IP address of the client terminal 100 and includes the identifier of the print plug-in. The print plug-in transmits the generated HTML to the collaboration tool and cause the collaboration tool to execute it. By executing the HTML received from the print plug-in, the collaboration tool acquires the IP address of the client terminal 100 from the client terminal 100. Then, the collaboration tool notifies the print plug-in of the acquired IP address. The acquisition of the IP address of the client terminal in S8001 of FIG. 9 can be performed using the same method as above. The print plug-in transmits, to the collaboration tool, a code of HTML or JavaScript that includes a command for acquiring the IP address of the client terminal based on the notification from the collaboration tool. The collaboration tool acquires the IP address of the client terminal by executing the code received from the print plug-in. The collaboration tool notifies the print plug-in of the acquired IP address. Based on the IP address acquired from the collaboration tool, the print plug-in performs the processing in S8002.

In the above description, the print plug-in transmits an HTML or a JavaScript containing a command for acquiring the IP address to the collaboration tool, and the collaboration tool runs this program. The print plug-in may transmit an HTML or a JavaScript containing a command for acquiring the IP address of the client terminal to the client terminal. In this case, the client terminal runs the received program by using the browser function provided in the collaboration tool application installed in the client terminal. The IP address of the client terminal acquired by running the program by the browser function provided in the collaboration tool application may be notified to the print plug-in.

In the foregoing embodiments, the IP address is used as the network information. However, the network information is not limited to the IP address. Any information may be used as long as the location of the client terminal accessing the collaboration tool can be known. For example, GPS information of the client terminal may be used as the network information.

The disclosed technique may be implemented by execution of the following process. Specifically, the process involves supplying software (program) for realizing the functions of the above-described embodiments to a system or an apparatus via a network or any of various kinds of storage medium, and causing a computer (or a CPU or an MPU) in the system or the apparatus to read and execute its program code. In this case, the computer program, and the storage medium containing the computer program, embodies the present disclosure.

Implementing the disclosed technique makes it possible to present, to the user, the default printer that is suitable for the user's location of printing at the time of cloud print execution.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control method for controlling a server system providing a chat service, the control method comprising:
receiving, via the chat service, a request message for registering a printer as a default printer from an information processing apparatus, wherein the request message is automatically input in an input region of a chat room of the chat service by scan of a Quick Response (QR) code printed by the printer;
registering the printer, as the default printer, corresponding to an Internet Protocol (IP) address of the information processing apparatus based on information of the printer included in the request message, wherein a first printer is registered in association with a first IP address and a second printer different from the first printer is registered in association with a second IP address different from the first IP address;
receiving an instruction for printing a file uploaded by using the chat service and an IP address of the information processing apparatus;
causing a display of the information processing apparatus to display the registered first printer as the default printer in a case where the first IP address is received; and
causing the display to display the registered second printer as the default printer in a case where the second IP address is received.

2. The control method according to claim 1, wherein the first IP address and the second IP address are to be used for the information processing apparatus to access the server system.

3. The control method according to claim 1, further comprising:
causing the display to display the first printer or the second printer on a print setting screen.

4. The control method according to claim 1, further comprising:
causing the display to display the chat room for registration of a default printer.

5. The control method according to claim 1, further comprising:
receiving the IP address of the information processing apparatus, the IP address being an IP address of the information processing apparatus at the time that the instruction is received.

6. The control method according to claim 1, further comprising:
causing the display to display a notification indicating that a print process based on the file has been completed.

7. A non-transitory computer-readable storage medium storing a computer program related to a method of controlling a server system that provides a chat service, the method comprising:
receiving, via the chat service, a request message for registering a printer as a default printer from an information processing apparatus, wherein the request message is automatically input in an input region of a chat room of the chat service by scan of a Quick Response (QR) code printed by the printer;
registering the printer, as the default printer, corresponding to an Internet Protocol (IP) address of the information processing apparatus based on information of the printer included in the request message, wherein a first printer is registered in association with a first IP address and a second printer different from the first printer is registered in association with a second IP address different from the first IP address;

receiving an instruction for printing a file uploaded by using the chat service and an IP address of the information processing apparatus;

causing a display of the information processing apparatus to display the registered first printer as the default printer in a case where the first IP address is received; and causing the display to display the registered second printer as the default printer in a case where the second IP address is received.

8. The non-transitory computer-readable storage medium according to claim 7, wherein the first IP address and the second IP address are to be used for the information processing apparatus to access the server system.

9. The non-transitory computer-readable storage medium according to claim 7, the method further comprising:
causing the display to display the first printer or the second printer on a print setting screen.

10. The non-transitory computer-readable storage medium according to claim 7, the method further comprising:
causing the display to display the chat room for registration of a default printer.

11. The non-transitory computer-readable storage medium according to claim 7, further comprising:
receiving the IP address of the information processing apparatus, the IP address being an IP address of the information processing apparatus at the time that the instruction is received.

12. The non-transitory computer-readable storage medium according to claim 7, the method further comprising:

causing the display to display a notification indicating that a print process based on the file has been completed.

13. An information processing apparatus that communicates with a server system providing a chat service, the information processing apparatus comprising:
at least one memory storing instructions; and
a controller configured to:
receive, via the chat service, a request message for registering a printer as a default printer from another information processing apparatus, wherein the request message is automatically input in an input region of a chat room of the chat service by scan of a Quick Response (OR) code printed by the printer;
register the printer, as the default printer, corresponding to an Internet Protocol (IP) address of the another information processing apparatus based on information of the printer included in the request message, wherein a first printer is registered in association with a first IP address and a second printer different from the first printer is registered in association with a second IP address different from the first IP address;
receive an instruction for printing a file uploaded by using the chat service and an IP address of the another information processing apparatus;
cause a display of the another information processing apparatus to display the registered first printer as the default printer in a case where the first IP address is received; and
cause the display to display the registered second printer as the default printer in a case where the second IP address is received.

\* \* \* \* \*